US008202598B2

(12) United States Patent
Peters et al.

(10) Patent No.: US 8,202,598 B2
(45) Date of Patent: Jun. 19, 2012

(54) OPTICAL ARTICLE HAVING AN ELECTRICALLY RESPONSIVE LAYER AS AN ANTI-THEFT FEATURE AND A SYSTEM AND METHOD FOR INHIBITING THEFT

(75) Inventors: Andrea Jeannine Peters, Clifton Park, NY (US); Marc Brian Wisnudel, Clifton Park, NY (US); Ben Purushotam Patel, Niskayuna, NY (US); Matthew Jeremiah Misner, Scotia, NY (US); Kasiraman Krishnan, Clifton Park, NY (US); Kaustubh Ravindra Nagarkar, Guilderland, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 1270 days.

(21) Appl. No.: 11/864,509

(22) Filed: Sep. 28, 2007

(65) Prior Publication Data

US 2008/0012707 A1 Jan. 17, 2008

Related U.S. Application Data

(63) Continuation-in-part of application No. 11/286,279, filed on Nov. 21, 2005, now abandoned, and a continuation-in-part of application No. 11/538,451, filed on Oct. 4, 2006, now Pat. No. 7,998,546.

(51) Int. Cl.
*B32B 3/02* (2006.01)

(52) U.S. Cl. .................... 428/64.4; 428/195.1; 428/209; 428/916; 369/33.01; 369/284; 340/4.4; 252/583

(58) Field of Classification Search ................. 428/64.4, 428/64.8, 195.1, 209, 916; 369/33.01, 284; 340/4.4; 252/583
See application file for complete search history.

(56) References Cited

U.S. PATENT DOCUMENTS 4,309,255 A 1/1982 Gendler et al.

(Continued)

FOREIGN PATENT DOCUMENTS

WO 98/40930 A1 9/1998

(Continued)

OTHER PUBLICATIONS

Kerr, J.B., "Polymer Electrolytes: an overview", Chapter IV-2, 2004, pp. 1-41.

(Continued)

*Primary Examiner* — Gerard Higgins
(74) *Attorney, Agent, or Firm* — Fletcher Yoder P.C.

(57) ABSTRACT

A method of changing a functionality of an optical article is provided. The method includes exposing the optical article to an external stimulus. The optical article includes an electrically responsive layer being configured to transform from a first optical state to a second optical state upon exposure to the external stimulus. The electrically responsive layer is configured to transform from a first optical state to a second optical state upon exposure to an external stimulus, and is capable of irreversibly transforming the optical article from the pre-activated state of functionality to the activated state of functionality. The electrically responsive layer includes an ion-conducting polymeric material, an electrically responsive material dispersed in the ion-conducting polymeric material, an electrolyte and at least one pair electrodes in electrical communication with the electrically responsive layer, wherein the electrodes are in electrical communication with the same surface of the electrically responsive layer. Also provided is an activation system for transforming an optical article from a pre-activated state of functionality to an activated state of functionality.

18 Claims, 11 Drawing Sheets

U.S. PATENT DOCUMENTS

| | | | | |
|---|---|---|---|---|
| 4,374,001 | A | 2/1983 | Bernier | |
| 4,439,280 | A | 3/1984 | Gendler et al. | |
| 4,443,302 | A | 4/1984 | Gendler et al. | |
| 4,444,626 | A | 4/1984 | Bernier et al. | |
| 4,478,687 | A | 10/1984 | Gendler et al. | |
| 5,141,622 | A | 8/1992 | Fauteux et al. | |
| 5,491,262 | A | 2/1996 | Hung | |
| 5,928,572 | A * | 7/1999 | Tonar et al. | 252/583 |
| 6,795,464 | B2 | 9/2004 | Lawandy | |
| 7,227,445 | B2 | 6/2007 | Atkinson | |
| 7,351,460 | B2 * | 4/2008 | Kojima et al. | 428/64.4 |
| 2002/0012156 | A1 * | 1/2002 | Varaprasad et al. | 359/273 |
| 2002/0041443 | A1 * | 4/2002 | Varaprasad et al. | 359/603 |
| 2002/0163479 | A1 | 11/2002 | Lin et al. | |
| 2004/0022542 | A1 | 2/2004 | Atkinson | |
| 2004/0054594 | A1 | 3/2004 | Forster et al. | |
| 2005/0110978 | A1 | 5/2005 | Potyrailo et al. | |
| 2005/0167510 | A1 | 8/2005 | Potyrailo et al. | |
| 2006/0018231 | A1 * | 1/2006 | Kojima et al. | 369/100 |
| 2006/0028924 | A1 | 2/2006 | Atkinson | |
| 2006/0227696 | A1 * | 10/2006 | Smith et al. | 369/275.1 |
| 2006/0234003 | A1 | 10/2006 | Selinfreund | |
| 2007/0070867 | A1 | 3/2007 | Forster et al. | |
| 2007/0143774 | A1 * | 6/2007 | Agrawal et al. | 720/738 |

FOREIGN PATENT DOCUMENTS

| | | | |
|---|---|---|---|
| WO | 2004/095447 | A1 | 11/2004 |
| WO | 2007/016430 | A2 | 2/2007 |
| WO | 2007/016546 | A2 | 9/2007 |

OTHER PUBLICATIONS

Isaksson, J., "Electrochemical Switching of Color and Wettability in Conjugated Polymer Devices", Linkopings Universitet, 2005, pp. 1-53.

Barthélémy Nyasse, Leif Grehn, Ulf Ragnarsson, Hernani L. S. Maia, Luis S. Monteiro, Ivo Leito, Ilmar Koppel, Juta Koppel, "Synthesis and cathodic cleavage of a set of substituted benzenesulfonamides including the corresponding tert-butyl sulfonylcarbamates: pKa of sulfonamides"; J. Chem. Soc., Perkin Trans. 1, 1995, (16),2025-2031.

* cited by examiner

OPTICAL ARTICLE HAVING AN ELECTRICALLY RESPONSIVE LAYER AS AN ANTI-THEFT FEATURE AND A SYSTEM AND METHOD FOR INHIBITING THEFT

The present patent application is a continuation-in-part application from U.S. patent applications Ser. No. 11/286,279, filed Nov. 21, 2005, and Ser. No. 11/538,451, filed Oct. 4, 2006, the disclosures of which are hereby incorporated by reference in their entireties.

BACKGROUND

The invention generally relates to an optical article, particularly, the invention relates to an optical article having an electrically responsive material as an anti-theft feature and a method for inhibiting theft of the optical article.

Shoplifting is a major problem for retail venues and especially for shopping malls, where it is relatively difficult to keep an eye on each customer while he/she shops or moves around in the store. Relatively small objects, such as CDs and DVDs are easy targets as they can be easily hidden and carried out of the store without getting noticed. Stores, as well as the entertainment industry, incur monetary losses because of such instances. This problem becomes more severe if the CDs or DVDs are stolen from places like offices due to the sensitive nature of the information contained within the article.

Even though close circuit surveillance cameras may be located at such places, theft still occurs. Consumable products sometimes are equipped with theft-deterrent packaging. For example, clothing, CDs, audio tapes, DVDs and other high-value items sometimes are packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items in store shelves and warehouses. Other theft-deterrent technologies currently used for optical discs include special hub caps for DVD packaging that lock down the DVD and prevent it from being removed from the packaging until the DVD is purchased. Similarly, "keepers" that are attached to the outside of the DVD packaging also prevent the opening of the packaging until the DVD is purchased. In some cases, retailers have resorted to storing merchandise in locked glass display cases. In other stores, the DVD cases on the shelves are empty, and the buyer receives the actual disc when the movie is purchased. Many of these approaches are unappealing in that they add an additional inconvenience to the buyer or storeowner or they are not as effective at preventing theft as desired. Optical articles, in particular, pose an additional problem in that they are very easy to remove from their packaging and the sensor/anti-theft tags may be removed easily.

BRIEF DESCRIPTION

Embodiments of the systems and techniques described herein are directed to an optical article having an anti-theft feature and a method for inhibiting theft of the same.

One embodiment of the present disclosure is directed to a method of changing a functionality of an optical article. The method includes exposing the optical article to an external stimulus. The optical article includes an electrically responsive layer being configured to transform from a first optical state to a second optical state upon exposure to the external stimulus. The electrically responsive layer is configured to transform from a first optical state to a second optical state upon exposure to an external stimulus, and is capable of irreversibly transforming the optical article from the pre-activated state of functionality to the activated state of functionality. The electrically responsive layer includes a binder material, an electrically responsive material, an electrolyte and at least two electrodes in electrical communication with the electrically responsive layer, wherein the electrodes are in electrical communication with the same surface of the electrically responsive layer.

Another embodiment of the present disclosure is directed to an activation system for transforming an optical article from a pre-activated state of functionality to an activated state of functionality. The activation system includes an optical article. The optical article includes at least one data side and an electrically responsive layer having a first surface and a second surface, wherein the electrically responsive layer is characterized by an optical absorbance in the range of about 200 nm to about 800 nm. The electrically responsive layer is configured to transform from a first optical state to a second optical state upon exposure to an external stimulus, and is capable of irreversibly transforming the optical article from the pre-activated state of functionality to the activated state of functionality. Furthermore the activation system includes at least two electrodes in electrical communication with the electrically responsive layer, wherein the electrodes are in electrical communication with the same surface of the electrically responsive layer. The activation system also includes an activation device for applying the external stimulus to the optical article to effect a change in at least one optical property of the optical article and thereby activating the optical article, wherein the activation system is operably coupled to the optical article through a communication device, wherein the communication device provides an activation signal to the activation device to permit activation of the optical article.

These and other advantages and features will be more readily understood from the following detailed description of embodiments that are provided in connection with the accompanying drawings.

DETAILED DESCRIPTION

Figure 1:
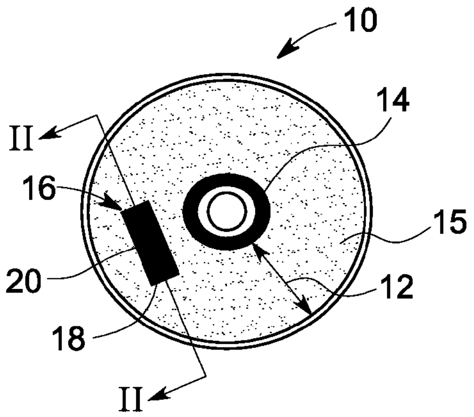
FIG. 1 is a schematic view of an optical article having an electrically responsive material disposed thereon in accordance with an embodiment of the systems described herein.

The embodiments described below relate to an optical article having an anti-theft feature to inhibit theft or unauthorized use of the optical article. One solution to the shoplifting problem, specifically for optical media articles such as DVD's, is to render at least a portion of the content of the DVD inaccessible unless the retailer at the point-of-sale has activated the DVD. One approach to rendering the content of the DVD inaccessible prior to activation is to employ an electrically responsive layer in or on the DVD, wherein the electrically responsive layer at least partially absorbs the incident laser light from an optical data reader so that the complete data directly in the optical path of the laser light cannot be read. In this instance, the optical article has no value, and therefore there is no incentive for the shoplifter to steal it. However, upon converting the DVD to an "activated" state using an external stimulus at the point-of-sale, the electrically responsive layer becomes sufficiently transparent, with respect to the wavelength of the laser light employed in the optical data reader, due to a change in the optical properties of the electrically responsive layer, and the complete data directly in the optical path of the laser light can now be read by the incident laser light from the optical data reader, therefore rendering the full content of the DVD accessible to a legitimate consumer. Aspects of the embodiments described herein can be used in combination with the materials, systems and techniques disclosed in GE Reference Ser. No. 11/864,501 titled: ELECTRICALLY RESPONSIVE INK AND COATING COMPOSITIONS AND METHODS FOR ACTIVATION filed Herewith, which is co-pending with the present disclosure, and is hereby incorporated by reference in its entirety.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise. As used herein, the term "secured to" or "disposed over" or "deposited over" or "disposed between" refers to both secured or disposed directly in contact with and indirectly by having intervening layers therebetween. "Operably coupled" is a relationship between listed parts that provides a stated function. As used herein, the weight average molecular weight Mw of the polymers used in the examples have been measured using gel permeation chromatography (GPC) technique using polystyrene standards. As used herein the term electrical communication means that an electrical current or electrical voltage may be passed between the layers that are in electrical communication, which may or may not be in direct physical contact.

In one embodiment, is provided an optical article configured for transformation from a pre-activated state of functionality to an activated state of functionality. The optical article includes at least one data side. The optical article also includes an optical data layer for storing data. Furthermore, the optical article includes an electrically responsive layer having a first surface and a second surface, wherein the electrically responsive layer is characterized by an optical absorbance in the range of about 200 nm to about 800 nm. The electrically responsive layer is configured to transform from a first optical state to a second optical state upon exposure to an external stimulus, and is capable of irreversibly transforming the optical article from the pre-activated state of functionality to the activated state of functionality. The electrically responsive layer includes a binder material, an electrically responsive material, an electrolyte and at least two electrodes in electrical communication with the electrically responsive layer, wherein the electrodes are in electrical communication with the same surface of the electrically responsive layer.

In various embodiments, the optical article may be a compact disc (CD), a digital versatile disc (DVD), multi-layered structures, such as DVD-5 or DVD-9, multi-sided structures, such as DVD-10 or DVD-18, a high definition digital versatile disc (HD-DVD), a Blu-ray disc, a near field optical storage disc, a holographic storage medium, or another like volumetric optical storage medium, such as, a multi-photon absorption storage format. In other embodiments, the optical article may also be an identification card, a passport, a payment card, a driver's license, a personal information card, or any other documents or devices, which employ an optical data layer for data storage. As will be described in detail below, in these embodiments, the anti-theft feature renders the article unreadable by the optical reader until it is legitimately activated prior to being issued to the concerned authority.

As used herein, the term "optical article" refers to an article that includes an optical data layer for storing data. The data stored in the optical data layer may be read by, for example, an incident laser light of an optical data reader device such as a standard compact disc (CD) or digital versatile disc (DVD) drive, commonly found in most computers and home entertainment systems. The optical data layer may include one or more layers.

As discussed above, in one embodiment, the electrically responsive layer includes a binder material, an electrically responsive material, and an electrolyte. The electrically responsive layer may have an ion-conductivity of greater than about $10^{-8}$ Siemens per centimeter (S/cm). The electrically responsive layer may further include a plasticizer, a pH modifier, and an anti-photobleach agent.

In various embodiments, the binder material may include one or more of a polymeric material or an ion-conducting polymeric material. Suitable polymeric materials include one or more of a homopolymer, a cross-linked polymer, a copolymer, a branched polymer, polymer blends, and polymer precursors. Non-limiting examples of suitable polymers include poly(alkenes), poly(anilines), poly(thiophenes), poly(pyrroles), poly(acetylenes), poly(dienes), poly(acrylics), poly (methacrylics), poly(vinyl ethers), poly(vinyl thioethers), poly(vinyl alcohols), poly(vinyl ketones), poly(vinyl halides), poly(vinyl nitriles), poly(vinyl esters), poly(styrenes), poly(arylenes), poly(oxides), poly(carbonates), poly (esters), poly(anhydrides), poly(urethanes), poly(sulfonates), poly(siloxanes), poly(sulfides), poly(thioesters), poly(sulfones), poly(sulfonamides), poly(amides), poly(ureas), poly (phosphazenes), poly(silanes), poly(silazanes), poly(benzoxazoles), poly(oxadiazoles), poly (benzothiazinophenothiazines), poly(benzothiazoles), poly (pyrazinoquinoxalines), poly(pyromellitimides), poly (quinoxalines), poly(benzimidazoles), poly(oxindoles), poly (oxoisoindolines), poly(dioxoisoindolines), poly(triazines), poly(pyridazines), poly(piperazines), poly(pyridines), poly (piperidines), poly(triazoles), poly(pyrazoles), poly(pyrrolidines), poly(vinyl pyrrolidone)poly(carboranes), poly(oxabicyclononanes), poly(dibenzofurans), poly(phthalides), poly(acetals), carbohydrates, cyanoresins, polyolefins, poly (vinylchlorides), poly(vinylidene fluoride), poly(etherimides), poly(etherketones), and copolymers thereof. In one embodiment, the polymer component comprises a Nafion™ polymer, a poly(vinyl butyral) polymer, or a poly(vinylpyrrolidone-co-vinyl acetate) copolymer. In a particular embodiment, the polymer component comprises a poly(methyl methacrylate-co-ethylene oxide copolymer, a polystyrene-ethylene oxide copolymer, a poly(styrene-methyl methacrylate-ethylene oxide), a poly(carbonate-ethylene oxide)copolymer or a poly(carbonate-propylene oxide)copolymer. Other ethylene oxide-containing copolymers are effective including those prepared by polymerizing PEG methacrylate or PEG acrylate with other methacrylates or acrylates. Aspects of the embodiments described herein can be used in combination with the materials, systems and techniques previously disclosed in U.S. patent application Ser. No. 11/763,927 and Ser. No. 11/763,942. Thus the disclosures of U.S. patent application Ser. No. 11/763,927 and Ser. No. 11/763,942, filed Jun. 15, 2007, are both hereby incorporated by reference in their entireties.

The electrolyte primarily functions as the ionic charge carrier within the electrically responsive material. In one embodiment, the electrolyte includes ionic liquids and salts. The concentration of the electrolyte in the electrically responsive layer is such that the ion conductivity of the coating is equal to or greater than about $10^{-8}$ S/cm. In one embodiment, the salts include metal salts, such as for example, alkali metal salts, alkaline earth metal salts, and onium salts. Suitable examples of salts include one or more of ammonium salts, phosphonium salts, lithium salts, sodium salts, potassium salts, and cesium salts. The anions of the lithium salts, sodium salts, potassium salts, cesium salts or ammonium salts may be selected from, but not limited to, the group consisting of iodides, bromides, chlorides, chlorates, tetrafluoroboates, hexafluoro phospate, trifluoromethanesulfonates, perchlorate, and thiocyanates. Other suitable electrolyte materials may include ionic materials, solvent-based liquid electrolytes, polyelectrolytes, polymeric electrolytes, solid electrolytes, and gel electrolytes.

Examples of suitable gel electrolytes may include appropriate redox active components and small amounts of multiple ligand-containing polymeric molecules gelled by a metal ion complexing process. Organic compounds capable of complexing with a metal ion at a plurality of sites (e.g., organic compounds including ligating groups) may be used in various embodiments. A given redox component may be a liquid by itself or have solid components dissolved in a liquid solvent. Ligating groups are functional units that contain at least one donor atom rich in electron density, e.g., oxygen, nitrogen, sulfur, phosphorous, among others. Multiple ligating groups, which may be present in the polymeric material, may occur in either the side chain or part of the materials molecular backbone, in part of a dendrimer, or in a starburst molecule.

In various embodiments, the electrolyte may include a gelling compound having a metal ion and an organic compound capable of complexing with the metal ion at a plurality of sites. Suitable metal ions include alkali and alkaline earth metals, such as lithium. In one embodiment, the organic compound may be a polymeric compound. Suitable organic compounds include poly(4-vinyl pyridine), poly(2-vinyl pyridine), polyethylene oxide, polyurethanes, and polyamides. In one embodiment, the gelling compound may be a lithium salt having the chemical formula LiX, wherein X may be a suitable anion, such as, for example, a halide, perchlorate, thiocyanate, trifluoromethyl sulfonate, or hexafluorophosphate. In another embodiment, the electrolyte includes a compound of the formula $M_iY_j$, wherein i and j are both variables independently having a value greater than or equal to 1. Y may be a suitable monovalent or polyvalent anion such as a halide, perchlorate, thiocyanate, trifluoromethyl sulfonate, hexafluorophosphate, sulfate, carbonate, or phosphate, and M is a monovalent or polyvalent metal cation such as Li, Cu, Ba, Zn, Ni, lanthanides, Co, Ca, Al, Mg, or other suitable metals.

Suitable polymeric electrolytes may include poly(vinyl imidazolium halide) and lithium iodide and/or polyvinyl pyridinium salts. Suitable polyelectrolytes may include between about 5 percent and about 95 percent by weight of a polymer based on the total weight of the electrically responsive layer, such as for example, an ion-conducting polymer, and about 5 percent to about 95 percent by weight of a plasticizer based on the total weight of the electrically responsive layer.

In one embodiment, an ion-conducting polymeric material may be prepared by first combining the ionic salt (i.e., an electrolyte) with a polymer that functions as a carrier for the electrolyte. Suitable polymers and electrolytes used for forming the ion-conducting polymeric material include the polymeric materials and electrolytes discussed above. In certain embodiments, in order to prevent the phase separation between the semi-conducting polymer and the ionic electrolyte polymer (such as PEO:Lithium salt), it may be desirable to employ a polymer having both electrical and ionic conductivities in the electrically responsive layer. In such embodiments, an additional polymeric ionic electrolyte may not be required in the electrically responsive layer. The ion-conducting polymeric material may include one or more of poly (ethylene oxide) (PEO), poly(propylene oxide) (PPO), poly (acrylonitrile) (PAN), poly(ethyl methacrylate), poly (vinylpyrrolidone), poly(methyl methacrylate) (PMMA), sulfonated tetrafluoroethylene copolymer (such as Nafion™, tetrafluoroethylene-perfluoro-3,6-dioxa-4-methyl-7-octene-sulfonic acid copolymer), poly(vinylbutyral), poly(vinylacetate), poly(ethers), poly(phenols) and copolymers thereof.

The term "electrically responsive material" is used to describe materials that undergo a reversible or irreversible electrically induced change, for example, a color change. In various embodiments, the electrically responsive material may be selected from one or more of a dye, an initiator, a catalyst, an electrochemical acid generator, an electrochemical base generator, an electrochemically polymerizable material, an electrochromic material, and a redox material.

In one embodiment, the dye may include one or more of a leuco dye, a pH sensitive dye, an electrochemically degradable dye, an electrochemically responsive dye, and a redox dye. Suitable examples of dyes include one or more of bromocresol green, bromocresol purple, bromophenol blue, thymolphthalein, thymol blue, aniline blue WS, durazol blue 4R, durazol blue 8G, magenta II, mauveine, naphthalene blue black, orceen, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine.

In one embodiment, the electrochromic polymeric materials include one or more of non-cross-linkable and cross-linkable homopolymers, and copolymers doped with commercially available electrochromic dyes commonly known to those skilled in the art. Suitable polymers include polymers disclosed above for the binder material. Suitable dyes include the electrically responsive dyes listed above In one embodiment, the electrically responsive layer comprises an electrically responsive material capable of an electrically induced change in bond connectivity. One example of an electrically responsive layer capable of undergoing an electrically induced change in bond connectivity is one which comprises a material capable of undergoing an electrically-induced sigmatropic bond rearrangement resulting in a change in the optical properties of the electrically responsive material. Examples of molecules that undergo an electrically induced change in bond connectivity are diarylalkenes and fulgides. Another representative example of a material capable of undergoing an electrically induced change in bond connectivity is an electrically reactive adduct material, which undergoes a change in visible absorbance upon electrical degradation of the adduct. Alternatively, the electrically responsive material may comprise a material that undergoes a change in optical absorbance as a result of a change in the formal oxidation state of the material that may or may not include a change in bond connectivity.

In one embodiment, the electrically responsive material is a dye material comprising an electrically labile protecting group (e.g., a group which is introduced into the dye material by chemical modification of a functional group in order to change the chemoselectivity of the functional group and to change the optical absorbance of the dye material). Suitable classes of electrically labile protecting groups include acid catalyzed protecting groups and base catalyzed protecting groups commonly known to one skilled in the art of organic synthesis, including but not limited to, protecting groups comprising a carbonyl group, protecting groups comprising a silyl group, protecting groups comprising a sulfonate group, and protecting groups comprising at least 4 carbon atoms (i.e. the tert-butoxycarbonyl group and the fluorenylmethoxycarbonyl group). Additionally, suitable protecting groups may be found in U.S. Pat. Nos. 6,486,319 and 6,958,181.

Alternatively, the electrically responsive material could be a pH-responsive dye where a change in the acidity or basicity of the electrically responsive material results in a change in the optical absorbance of the dye material. This process is also known as "acidichromism" or "halochromism". The change in the optical absorbance of the dye material could result in converting the optical article from one state of functionality to another. Within the scope of this disclosure the terms "pH" or "change in pH" are used to describe the acidity, basicity, or change in acidity or basicity of the optical-state change material. A decrease in pH is a result of an increase in acidity (or decrease in basicity) and an increase in pH is a result of a decrease in acidity (or increase in basicity). In aqueous systems, pH values less than 7 are classified as acidic and pH values greater than 7 are classified as basic.

In one embodiment, the electrically responsive material may include one or more of a pH responsive dye, an electrically responsive acid, and an electrically responsive base. For example, the electrically responsive material may contain a pH responsive dye such as bromocresol green or bromocresol purple which can change their maximum optical absorbance from about 600-650 nm at about a pH value greater than about 7 to below 450 nm at pH values less than about 5. The electrochemically responsive acid generator is a material which, when exposed to an electrical stimulus, generates protons (i.e., acid) in the electrically responsive layer. Suitable examples of electrically responsive acid generators include phenols, hydrazines, sulfonate esters and benzyl benzoate. Specific examples include biphenol, m-cresol, p-cresol, o-cresol, and diphenylhydrazine.

In another embodiment, the electrically responsive material may include electrochemical polymerizable monomers. For example, the electrically responsive material may contain an electropolymerizable material such as a thiophene, with a maximum optical absorbance of less than 300 nm, which can undergo an electrochemical oxidation reaction to produce a polythiophene polymer, with a maximum optical absorbance of greater than 500 nm.

The electrically responsive layer may be deposited on the surface of the optical article using a variety of methods known the art, such as for example sputtering or coating. An electrically responsive ink composition may be employed to deposit the electrically responsive layer on a surface of the optical article. The ink composition used includes a solvent in addition to the polymer, the electrically responsive material and the electrolyte contained in the electrically responsive layer. In various embodiments, the electrically responsive layer further comprises a solvent. In various embodiments, the solvents used in the electrically responsive layer are selected based on different parameters as discussed herein. In one embodiment, a suitable solvent may be selected to satisfy the solubility of various components in the electrically responsive ink composition including the binder material, the electrically responsive optical-state change material, and the electrically responsive pH modifier. In another embodiment, wherein the electrically responsive ink composition is used to deposit an electrically responsive coating composition, the solubility of the different components of the electrically responsive ink composition in the solvent should be such that there will be no phase separation of the different components during the post-deposition drying step.

In a further embodiment, wherein the electrically responsive ink composition is used to deposit an electrically responsive coating composition on an article suitable solvents include those that exhibit a chemical inertness towards the material used to form the article. For example if the article is an optical article such as for example a DVD made using a polycarbonate, the selected solvent(s) should not induce solubilization, crystallization, or any other form of chemical or physical attack of the polycarbonate. This is essential to preserve the readability of the data underneath the electrically responsive coating composition.

In one embodiment, in the case of solvent mixtures the volume fraction of any solvent that could potentially attack the polycarbonate may be less than about 30 percent. As used herein the term "surface tension" refers to a property of the liquid that affects the spreading of a liquid on a surface. The surface tension will have a dramatic result on the final shape of a drop or multiple drops of liquid printed on solid surfaces. With respect to the ink formulations of the present disclosure, surface tension is a critical parameter for printing the ink formulations using conventional printing techniques such as, but not limited to, inkjet printing and screen-printing. Surface tension is also a parameter for the jetting process itself during inkjet printing, as it will affect how drops are formed at the print head. If the surface tension is not appropriate, inks will not be jettable with inkjet printing.

Other aspects of suitable solvents include, but are not limited to, low vapor pressure and high boiling points so that the electrically responsive ink composition is printable by methods known to one skilled in the art, such as for example, screen printing or ink-jet printing methods. Solvents with lower boiling points may evaporate rapidly from the ink, causing clogging of inkjet print head nozzles or drying onto a printing screen, either of which can lead to poor quality of the resultant electrically responsive layer. In one embodiment, a solvent with a boiling point above 130° C. is preferred. In various embodiments, the electrically responsive ink composition should be a physical mixture of the various components and there should be no reactivity between the components at least under ambient conditions.

In one embodiment, suitable solvents employed in the electrically responsive ink composition include, but are not limited to a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, an oxygenated hydrocarbon solvent, or miscible combinations thereof. Some specific suitable non-limiting examples of such solvents include diacetone alcohol, dipropylene glycol methyl ether (Dowanol DPM), 1-methoxy-2-propanol (Dowanol PM), butyl carbitol, ethylene glycol, glycerol with glycol ethers, cyclohexanone, and miscible combinations thereof.

In one embodiment, the electrically responsive layer may further include a plasticizer. Plasticizers are typically low molecular weight non-volatile substances which, when added to the polymer matrix, alter the properties of the matrix. For example, adding a plasticizer can increase the ionic conductivity of the ion-conducting polymer material, decrease the glass transition temperature of the polymer, increase the flexibility of the material, reduce the crystallinity of the polymer material, increase the polymer segmental motion and/or increase compatibility between the polymer and electrolyte blends. The plasticizer may assist in the dissociation of the ionic salt (i.e., electrolyte). The plasticizer needs to be compatible with the polymer so that phase separation of the plasticizer from the polymer material, resulting in poor film quality and/or decrease in ion conductivity, does not occur. In one embodiment, the plasticizers may have a boiling point greater than about 80° C. Examples of suitable plasticizers include one or more of ethylene carbonate, propylene carbonate, mixtures of carbonates, dimethyl carbonates, polyethylene glycol dimethyl ether, ethylene glycol, tetraethylene glycol, butyrolactone, dialkylphthalates (e.g., bis(2-ethylhexyl)phthalate and dibutylphthalate), 1,3-dioxolane, glymes such as tetraglyme, hexaglyme and heptaglyme, ionic liquids such as imidazolium salts (e.g., 1-methyl-3-octyl imidazolium bromide) and pyrrolidinium salts (e.g., 1-butyl-1-methylpyrrolidiniun bis(trifluoromethylsulfonyl)imide, polycaprolactone triol, bis(2-ethylhexyl)fumerate, bis(2-butoxyethyl) adipate, bis (2-ethylhexyl)sebacate, cellulose acetate, bis(2-ethylhexyl) adipate, glycerol propoxylate, bis(2-(2-butoxy)ethyl)adipate, triethylene glycol bis(2-ethylhexanoate)polyethyleneimine, diisodecyl adipate, bis(3,4-epoxy cyclohexyl-methyl)adipate, trioctyl trimellitate, dimethylformamide, and dimethylsulfoxide.

In one embodiment, the electrically responsive layer further comprises a pH modifier to adjust the pH of the electrically responsive layer. The pH modifier may be in one embodiment an electrically responsive material which is capable of generating either a Bronsted acid or a Bronsted base upon electrical stimulus. Suitable pH modifiers include either acids or bases. These pH modifiers may be of various types, including a mineral acid, an organic acid, a Lewis acid, a Bronsted acid, a superacid, an acid salt, an organic base, a Lewis base, a Bronsted base, a superbase, and basic salts. Suitable non-limiting examples of pH modifiers include acetic acid, trifluoroacetic acid, hydrochloric acid, nitric acid, sulfuric acid, triflic acid salts, benzoic acid, toluene sulfonic acid, ethanoic acid, oxalic acid, citric acid, ammonia, iodonium salts, triethylamine, methyl amine, cyclohexylamine, dicyclohexylamine, 1,8-bis(dimethylamino)naphthalene, 1,4-diazabicyclo[2.2.2]octane, pyridine, imidazole, potassium hydroxide, sodium hydroxide, dinonylnaphthalene sulfonate, dodecylbenzene sulfonate, p-toluenesulfonate, (4-phenoxyphenyl)diphenylsulfonium trifluoromethanesulfonate, bis(4-t-butylphenyl)iodonium p-toluenesulfonate, (4-t-butylphenyl)diphenlsulfonium triflate, triphenylsulfonium triflate, diphenyliodoniumhexafluorophosphate, ethyl p-toluenesulfonate, dipenyliodonium chloride, 4-octyloxyphenyl phenyl iodonium fluoroantimonate, ammonium hexafluroantimonate, and ethyl benzoate.

In yet another embodiment, the electrically responsive layer further comprises at least one anti-photobleaching agent. Photobleaching of the electrically responsive coating composition may occur through either a photoinduced oxidation and/or a photothermal degradation process. The anti-photobleach agent is added to retard the photo-induced degradation of the electrically responsive coating composition when exposed to either ultraviolet or visible light. Suitable non-limiting examples of anti-photobleach agents include, biphenol, mono-, di- and tri-hydroxy substituted aromatics (e.g., hydroquinone), and poly(hydroxystyrene). A general reference which describes various classes of anti-photobleach is F. Gugumus, "Light Stabilizers", in Plastics Additives Handbook, 5th Ed., H. Zweifel, ed., Hanser Publishers, 2001, pp. 141-425. In one embodiment, biphenol, biphenol derivative, or combinations thereof effectively reduce photobleaching. General structural examples of suitable biphenol derivatives can be found in U.S. patent application Ser. No. 10/391,401, filed Mar. 18, 2003. Suitable non-limiting examples of biphenol and biphenol derivatives include 4,4'- biphenol, 3,3'-biphenol, 2,2'-biphenol, 2,2',6,6'-tetramethyl-3,3',5,5'-tetrabromo-4,4'-biphenol, 2,2',6,6'-tetramethyl-3,3',5-tribromo-4,4'-biphenol, 3,3'-dimethylbiphenyl-4,4'-diol, 3,3'-ditert-butylbiphenyl-4,4'-diol, 3,3',5,5'-tetramethylbiphenyl-4,4'-diol, 2,2'-ditert-butyl-5,5'-dimethylbiphenyl-4,4'-diol, 3,3'-ditert-butyl-5,5'-dimethylbiphenyl-4,4'-diol, 3,3',5,5'-tetratert-butylbiphenyl-4,4'-diol, 2,2',3,3',5,5'-hexamethylbiphenyl-4,4'-diol, 2,2',3,3',5,5',6,6'-octamethylbiphenyl-4,4'-diol, 3,3'-di-n-hexylbiphenyl-4,4'-diol, 3,3'-di-n-hexyl-5,5'-dimethylbiphenyl-4,4'-diol, and the like.

Furthermore, the optical data layer may be protected by employing an outer coating, which is transparent to the incident laser light, and therefore allows the incident laser light to pass through the outer coating and reach the optical data layer. In one embodiment, at least a portion of the electrically responsive layer is coated with an optically transparent second layer. The optically transparent second layer serves as a protective coating for the electrically responsive material from chemical and/or physical damage. The optically transparent second layer may contain cross-linkable materials that can be cured using ultraviolet (UV) light or heat. In one embodiment, the optically transparent second layer has a conductivity of at least $10^{-10}$ S/cm. Furthermore, the optically transparent second layer may be a scratch resistant coating. For example, the optically transparent second layer may include, but is not limited to, a matrix consisting of cross-linkable acrylates, silicones, and nano or micron silicate particles.

As discussed above, the electrically responsive layer is capable of transforming from a first optical state to a second optical state upon exposure to an electrical stimulus. The change from the first optical state i.e., pre-activated state to the second optical state i.e., activated state, occurs due to the presence of the electrically responsive material. In one embodiment, the electrically responsive transformation from the first optical state to the second optical state is a bistable transformation. As used herein, the term "bistable transformation" is defined as a condition where the optical state of the electrically responsive layer corresponds to one of two possible free energy minima and the electrochromic responsive layer remains in its current optical state in the absence of an external electrical stimulus.

In various embodiments, the optical article may be transformed from a "pre-activated" state of functionality to an "activated" state of functionality. Conversion from the "pre-activated" state of functionality to the "activated" state of functionality is achieved by the authorized activation of the electrically responsive layer, which is disposed on the data side of the optical article. The data side refers to the side of the optical article having the optical data layer. The electrically responsive layer may be disposed in or on the optical article in the form of a single layer that is in optical communication with the optical data layer. The electrically responsive layer is activated or transformed from a first optical state to a second optical state upon exposure to one or more external stimuli. In one embodiment, the electrically responsive layer is capable of irreversibly altering the state of functionality of the optical article.

In the "pre-activated" state, at least one portion of the data from the optical data layer is unreadable by the incident laser light of an optical data reader device, however, this same portion of data can be read from the optical data layer in the "activated" state of functionality. As used herein, the term "pre-activated" state of functionality refers to a state of functionality of the optical article where the optical-state change material has not yet been exposed to one or more authorized external stimuli. In one embodiment, the "pre-activated" state comprises at least one electrically responsive layer which inhibits portions of the optical data layer that are located directly in the optical path of the incident laser light from being read by the optical data reader.

As used herein, the term "activated" state, refers to a state of functionality of the optical article where the optical data layer can be read by the optical data reader as a result of the optical article having been exposed to at least one authorized external stimuli. In one embodiment, the electrically responsive layer is at least partially transparent to the laser light from the optical data reader, and does not inhibit the data located directly in the optical path of the laser light from being read. In another embodiment, the laser light from the optical data reader is at least partially absorbed by the electrically responsive layer and prevents the data directly in the optical path of the laser light from being read.

The change in the optical properties of the electrically responsive layer upon authorized activation can occur using at least two approaches. In the first approach, the incident laser light from an optical data reader is at least partially absorbed by the electrically responsive layer in the "pre-activated" state, and the data falling directly in the optical path of the laser light cannot be read. In this instance, the optical article is unplayable. Upon converting the optical article to the "activated" state using an authorized external stimulus, the electrically responsive layer is at least partially transparent to the incident laser light from an optical data reader, the data directly in the optical path of the laser light can be read, and the optical article is playable. The second approach requires an additional "authoring" component that allows the optical article to be playable or unplayable, depending on whether portions of the data on the optical data layer can be read by the incident laser light from an optical data reader. In this second approach, the electrically responsive layer is at least partially transparent to the incident laser light from an optical data reader in the "pre-activated" state, and the data directly in the optical path of the laser light can be read. In this instance, the optical article is "authored" unplayable. Upon converting the optical article to the "activated" state using an authorized external stimulus, the incident laser light from an optical data reader, is at least partially absorbed by the electrically responsive layer, the data directly in the optical path of the laser light cannot be read, and the optical article is "authored" playable.

As used herein, the term "damaged" state refers to a state of functionality of the optical article where unauthorized activation of one or more optical-state change materials in or on the optical article has occurred. In one embodiment, the term "damaged" state refers to a state of functionality of the optical article where the optical article has undergone a physical modification such as, but not limited to, a scratch, a dimple, or a physical modification in or on the optical article. The "damaged" state may be a result of improper activation of one or more optical-state change materials in or on the optical article. In the "damaged" state at least a portion of the optical data layer cannot be read by the laser light of an optical data reader as a result of significant absorbance of the laser light by at least a portion of at least one electrically responsive optical-state change material. In contrast to the "activated" state, where all the electrically responsive layer is sufficiently transparent to the laser light from the optical data reader, in the "damaged" state at least a portion of the electrically responsive layer absorbs at least a portion of the wavelength of the incident laser light from the optical data reader and prevents the data directly in the optical path of the laser light from being read.

In various embodiments, the optical article comprises one or more electrically responsive layers having a first surface and a second surface. In embodiments where two or more electrically responsive layers are employed, each of the electrically responsive layers may be located at a unique location on the optical article, designed to function in concert as part of the anti-theft system. In one embodiment, at least two electrically responsive layers are in direct physical contact with each other, (i.e., juxtaposed next to each other). In various embodiment, the electrically responsive layers may be disposed on the optical article in the various forms selected from one or more of concentric lines, concentric arcs, concentric spots, patterned lines, patterned arcs, patterned spots, or lines or arcs which are positioned end-to-end. In one embodiment an optical article comprises at least two electrically responsive layers, wherein at least one electrically responsive layer is not transparent to the incident laser light of an optical data reader in the "pre-activated" state.

If the optical article is converted from the "pre-activated" state to the "damaged" state as a result of unauthorized activation, the optical properties of each of the electrically responsive layers are designed to change irreversibly such that at least a portion of the at least one of the electrically responsive layers absorbs the laser light from the optical data reader, and prevents the data directly in the optical path of the laser light from being read.

For example, in one embodiment the optical article comprises two electrically responsive layers, the first electrically responsive layer having an optical absorbance greater than about 0.35 in the "pre-activated" state (an electrically responsive layer with absorbance of 0.35 at the wavelength of the laser light partially absorbs the laser light such that the reflectivity of the optical article is about 45 percent), and the second electrically responsive layer having an optical absorbance less than about 0.35 in the "pre-activated" state. Upon authorized activation, the optical article is converted to the "activated" state where the optical properties of only the first electrically responsive layer is transformed such that the optical absorbance is less than about 0.35. Upon unauthorized activation, the optical article is converted to a "damaged" state where the optical absorbance of the first electrically responsive layer is transformed such that the optical absorbance is less than about 0.35 and the optical absorbance of the second electrically responsive layer is transformed such that the optical absorbance is greater than about 0.35.

The change in optical properties of the electrically responsive layer in or on an optical article upon exposure to an external stimulus (e.g., from the activation system) can appear in any manner that results in the optical data reader system receiving a substantial change in the amount of optical reflectivity detected. In certain embodiments, the change in the percent optical reflectivity or the percent transmittance of at least one portion of the optical data layer in the "pre-activated state" of functionality and the "activated" state of functionality is at least about 10 percent. As used herein the term "reflectivity" is defined as the ratio of reflected light to incident light.

For example, where the electrically responsive layer is initially opaque and becomes more transparent upon exposure to an authorized external stimulus, there should be a substantial increase in the amount of light reflected off of the data storage layer and transmitted to the optical reader device. For example, most blue materials typically change (reduce) the amount of reflected incident radiation detected by means of selective absorption at one or more given wavelengths of interest (e.g., 650 nm) corresponding to the type of optical data reader system.

In another example, where the optical article includes a DVD, in one embodiment, the "pre-activated" state of functionality is characterized by an optical reflectivity of at least a portion of the optical article being substantially less than about 45 percent. In another embodiment, the "pre-activated" state of functionality is characterized by an optical reflectivity of at least a portion of the optical article being less than about 20 percent. In yet another embodiment, the "pre-activated" state of functionality is characterized by an optical reflectivity of at least a portion of the optical article being less than about 10 percent. In these embodiments, the data in the optical data layer of the optical storage medium is not readable in the pre-activated state. It should be appreciated that any portion of the optical article that has an optical reflectivity of less than about 45 percent may not be readable by the optical data reader of a typical DVD player. Furthermore, the activated state is characterized by an optical reflectivity of that same portion of the optical article being substantially more than about 45 percent.

It should be appreciated that there are analogous predetermined values of optical properties for activating different optical articles. For example, the specified (as per ECMA-267) minimum optical reflectivity for DVD-9 (dual layer) media is 18 percent to 30 percent and is dependent upon the layer (0 or 1).

Suitable examples of external stimuli may include a laser light, infrared radiation, thermal energy, X-rays, gamma rays, microwaves, visible light, ultraviolet light, ultrasound waves, radio frequency waves, microwaves, electrical energy, chemical energy, magnetic energy, or combinations thereof. The interaction of the external stimulus with the optical article may include continuous, discontinuous, or pulsed forms of the external stimulus. In some embodiments, the external stimulus may vary with time in a predetermined fashion. For example, the external stimulus may be a time-dependent electrical stimulus, for example, an applied voltage that follows a time-dependent voltage profile.

As discussed above, the electrically responsive layer may be disposed on a surface of the optical article in the form of a topical coating. One or more electrically responsive layers may be disposed on the optical article in a discrete portion, a continuous film, or a patterned film. During authorization, a DC voltage may be applied to the electrically responsive layer in a continuous, discontinuous or pulsed form. In one embodiment, the voltage may be applied to the electrically responsive layer via electrodes that may be in electrical communication with the layer. In one embodiment, the electrical communication can be direct, such as for example, the electrodes may be placed in physical contact with the electrically responsive layer. In another embodiment, the communication can be indirect, such as for example, the electrodes may be connected with the electrically responsive layer using a conductive element, such as for example, a wire. In one embodiment, the wire may connect the electrodes to electrical conducting pads, which act as the voltage source. The electrodes and the electrical conducting pads may independently be made from materials such as for example, platinum, gold, silver, copper, titanium, nickel, aluminum, lithium, carbon, indium, tin, zinc and conjugated polymers.

In some embodiments, a portion of the optical article having the electrically responsive layer may undergo a change in an optical reflectivity of at least about 10 percent while transforming from a first optical state to a second optical state. In these embodiments, the change in the optical reflectivity may be brought about upon exposure to a voltage difference of 0.1 Volts to about 50 Volts applied across the electrically responsive layer. In other embodiments, a portion of the optical article having the electrically responsive layer may undergo a change in an optical transmittance by more than about 10 percent from a first optical state to a second optical state. In these embodiments, the change in the optical transmittance may be brought about upon exposure to a voltage difference of 0.1 Volts to about 50 Volts applied across the electrically responsive layer in a time duration of less than or equal to about 30 seconds.

Alternatively, instead of being disposed on the surface of the optical article, the electrically responsive layer may be disposed inside the structure of the optical article. For example, the electrically responsive layer may be disposed in the substrate on which the optical data layer is disposed. In such an embodiment, the electrically responsive layer may be disposed between the layers of the optical article, or may be disposed within one or more layers of the optical article. For example, the electrically responsive layer may be incorporated in the UV curable adhesive of the bonding (spacer) layer. In another example, the electrically responsive layer may be disposed between the polycarbonate substrate and reflective layer. In another example, the electrically responsive layer may be disposed in the polycarbonate substrate for the optical article. As used herein, the term "polycarbonate" refers to polycarbonates incorporating structural units derived from one or more dihydroxy aromatic compounds and may include co-polycarbonates and polyester carbonates. It should be appreciated that these electrically responsive layers should be thermally stable to withstand the molding temperatures of the optical article. Also, these electrically responsive layers may preferably absorb the wavelength of the laser light in one of the activated, or the pre-activated state of the optical article. Upon interaction with external stimulus, the electrically responsive layer present inside the electrically responsive layer changes color. As a result, the substrate may become transparent to the laser light, thereby facilitating the transmittance of laser light through the substrate and making the optical article readable.

In at least one embodiment, the electrically responsive layer is one part of an anti-theft system designed to prevent the unauthorized use of the optical article, and designed to work in combination with additional components of the anti-theft system such as a removable wireless activation tag.

As will be described in detail below, a tag having electrical circuitry may be employed to supply electrical energy to the electrically responsive layer. In an exemplary embodiment, the tag may be a wirelessly powered flexible tag (WPFT) having electrical circuitry. Examples of electrical circuitry may include radio frequency circuitry, which may be used to interact with the external stimulus to change the external stimulus first into electrical energy, which then interacts with the electrically responsive layer to change the functionality of the optical article. In another embodiment, the tag is in direct electrical contact with a power supply inside or outside of the DVD case, for example, the point-of-sale activation equipment. The WPFT may be removably coupled to a surface of the optical article using a pressure-sensitive adhesive or by using other coupling mechanisms. Non-limiting examples of coupling mechanisms include static cling, gravity, bracing, sandwiching, mechanical clamping or any other physical means of adhesion. The electrical circuitry may be configured to transform the external stimulus to time dependent electrical stimulus. The WPFT may be in direct contact with the electrically responsive layer. Alternatively, the WPFT may be coupled to the electrically responsive layer via electrically conductive pads.

Various embodiments of the WPFT described herein allow the wireless transfer of an external stimulus to the material capable of undergoing a optical state change through the WPFT, because the WPFT is configured to act as a "wireless" device. As used herein, the terms "wireless", "wirelessly", "wireless powered", "wirelessly powered" or "wireless activation" all refer to a mechanism of energy transfer in which an external stimulus, for example, electromagnetic energy is transported through space (e.g. without the use of any connecting wires or other physical connections) from a remote source to the WPFT. Non-limiting examples of suitable external stimuli that may be used to interact with the WPFT include laser light radiation, infrared radiation, thermal energy, X-rays, gamma rays, microwaves, visible light, ultraviolet light, ultrasound waves, sound waves, radio frequency (RF) waves, electrical energy, chemical energy, magnetic energy, mechanical energy, or combinations thereof. Furthermore, inter-conversion between any of the above listed external stimuli (e.g., conversion of radio frequency waves to electrical energy and/or thermal energy) is also contemplated for use with the systems described. The interaction of the external stimulus with the WPFT may include continuous, discontinuous, or pulsed forms of the external stimulus. In one embodiment, the external stimulus is radio frequency waves generated from an RF power supply source, and wirelessly supplied to the WPFT. The RF power supply may contain a programmable interface that controls the WPFT and optionally receives information back from the WPFT.

As used herein, the term "flexible" is synonymous with the term bendable, and the flexible aspect of a WPFT is analogous to the flexible aspect of other known flexible electronic devices such as flexible organic light emitting diodes, flexible liquid crystal displays, flexible circuit boards, and flexible solar cells. The flexible quality of the WPFT stems from the use of bendable materials within the WPFT, such as thin metal foils, plastics or other polymeric materials.

In various embodiments, the WPFT includes a coupling layer. The coupling layer may either be a single layer or may be a combination of a plurality of sub-layers, which may be collectively termed as the coupling layer. The thickness of the coupling layer may be uniform or may vary from one point to another. For example, the coupling layer may have a variable thickness when the coupling layer is patterned to form one or more recesses in which to dispose electrical circuits. In one embodiment the thickness of the coupling layer may be in a range from about 1 micron to about 100,000 microns. In a particular embodiment, the thickness of the coupling layer is from about 1 micron to about 1000 microns.

The coupling layer may be coupled to the optical article by employing variety of coupling mechanisms to promote attraction forces between the WPFT and the optical article. The coupling mechanisms may include an adhesive mechanism, an electrostatic mechanism, a chemical mechanism, an electrochemical mechanism, a thermal mechanism, a physical mechanism, a cross-linking mechanism, or any combination thereof. Non-limiting examples of suitable coupling mechanisms include static cling, gravity, bracing, sandwiching, mechanical fixing, clamping, chemical adhesion, or any other physical means of adhesion that affix the WPFT to the optical article. In some embodiments the coupling mechanism may enable reuse of the WPFT. In other words, the WPFT may be coupled and decoupled from the optical article more than once, as desired, and therefore it is envisioned that the WPFT could be a disposable device. Embodiments relating to the reuse of the WPFT with the same or different optical articles are described in more detail below with regard to the adhesive components of the coupling layer. Alternatively, the WPFT may be configured to function as an irremovable device once affixed to an optical article. The attraction forces produced by the above mentioned coupling mechanisms may or may not be uniform at the interface between the coupling layer and the optical article. For example, the attraction forces may be weaker at the edges of the WPFT to facilitate removal (e.g. peeling off) of the WPFT once the predetermined and desired electrical and/or thermal response has been induced in the optical article.

The coupling layer may include a plurality of individual sub-layers, which form a stack generally referred to as the coupling layer. In one embodiment, at least one sub-layer of the coupling layer comprises an adhesive component. Non-limiting examples of suitable adhesive components include pressure sensitive adhesives, epoxy based adhesives, thermoset adhesives, acrylate based adhesives, silicone-based adhesives, and elastomer based adhesives or any combination thereof. As use herein, the term "pressure-sensitive adhesive" includes all polymeric adhesive materials with a glass transition temperature (Tg) below about 50° C. In embodiments comprising an adhesive component, the coupling layer includes a first coupling surface with a first tack strength, and a second coupling surface with a second tack strength. As used herein, the term "tack strength" refers to "stickiness" of the coupling layer, and is a measurement of the strength of adhesion, typically measured in units of pounds-force per inch. The first surface of the coupling layer is typically coupled to the optical article to define a first region. The second surface of the coupling layer may be coupled to other components of the WPFT, such as an electrical circuit layer or an optional backing layer, to define a second region. In at least one embodiment, both the first and second surfaces of the coupling layer are coupled to the optical article.

In embodiments where the coupling layer comprises an adhesive component, one aspect of the coupling layer is the ability of the WPFT to be decoupled from an optical article such that the WPFT undergoes a "clean adhesive failure" at the first region between the coupling layer and the optical article. As used herein, the term "clean adhesive failure" is defined as the removal of the WPFT from the optical article such that no significant residue of the coupling layer is left behind on the optical article. As used herein, and with respect to the term "clean adhesive failure", the term "significant" refers to a quantity that affects or interferes with the usability of the optical article. For example, as will be described in detail below, in the case where the optical article is a DVD, "clean adhesive failure" of the WPFT from the surface of the of the DVD means that the quantity of residue of the coupling layer which might be left behind on the surface of the DVD, including residue which is not visible to the naked eye or touch, is sufficiently small in quantity as to not interfere with the readability of the DVD in a standard DVD reader.

The WPFT further comprises electrical circuitry, including at least one electrode. As used herein, the electrical circuitry may include, but does not require, one or more of the following: a transistor, a thermocouple, a light-emitting diode, a strain gauge, a sound detecting element, an antenna, a transistor, a diode, a rectifier, a logic chip, a radio frequency identification chip, a capacitor, an integrated circuit, an electrical receiver, a photocell, a rectifier, a resistor, a surface mount resistor, a chip resistor, a surface mount light emitting diode (LED) or any combination or multiple thereof. In one embodiment, the WPFT may also contain an integrated circuit with a programmable unique identification number such as is used in RFID tags. Various components of the electrical circuitry may be patterned onto the WPFT by a variety of microelectronic techniques including, but not limited to, lithography, sputtering, screen printing, ink-jet printing, or any other routine patterning method which is known to one skilled in the art of microelectronics. Alternatively, various components of the electrical circuitry may be added to the WPFT by physical means, such as "pick-and-place" or other robotic techniques commonly used in the microelectronics industry. In an exemplary embodiment, the electrical circuitry comprises a radio frequency circuit, including a radio frequency antenna coupled to various additional circuitry components. The radio frequency circuitry is in electrical communication with at least one electrode contained within the WPFT. The electrical circuitry may be disposed on a sub-layer of the coupling, or in embodiments where the WPFT employs an optional backing layer the electrical circuitry may be coupled to the backing layer.

The WPFT may be in operative association with one or more devices that receive energy from the external stimulus in one form and transfer it to the WPFT. The energy is then transferred from the WPFT to the optical article to which the WPFT is coupled to change the state of functionality of the optical article. For example, the WPFT may react with an external stimulus, such as radio frequency waves, and through operative association with the radio frequency circuitry within the WPFT, and convert the radio frequency waves into electrical energy. The converted electrical energy may then be transferred to the optical article in order to change the functionality of the optical article from the pre-activated state to the activated state. In case where the energy from the external stimulus is converted to an electrical response within the WPFT, current in the range from about 1 microampere to about 1 ampere and voltages in the range from about 1 millivolt to about 100 volts.

Additionally, the WPFT may include a feedback loop. The feedback loop may be configured to communicate with the source of the external stimulus that is at a remote location and provide inputs to regulate the exposure of WPFT to the external stimulus. For example, the feedback loop may be configured to maintain the voltage applied to the optical article within a predetermined voltage range by controlling the input of external stimulus to the WPFT. That is, the activation system has a feedback loop wherein the activation device sends a controlled voltage to the electrodes. Accordingly, when the voltage applied to the optical article exceeds the predetermined voltage range, the feedback loop communicates with the source of the external stimulus to reduce the amount of external stimulus interacting with the WPFT, thereby controlling the voltage applied to the optical article. Also, the activation system would maintain a record for the usage of the devices. For example, the activation device could record the activation event to an internal storage device or communicate to a network database. When employed to authorize an article, the activation system may be used to maintain records and/or to maintain inventory.

In some embodiments, the WPFT includes an integrated logic chip within its electrical circuitry, which is in wireless communication with an external authorization device that controls the output response of the WPFT through a feedback loop. The function of the integrated logic chip is to act as an internal "on/off" switch within the WPFT, such that the WPFT becomes operationally active (i.e., generates an electrical and/or thermal response in the optical article to which it is affixed) only once it has been authorized to do so by an external authorization device. This feature of the WPFT is useful in applications where there is a desire to control the function of the WPFT, such as anti-theft applications.

In one embodiment, energy may be delivered to the WPFT by inductive coupling of low frequency radio waves with a wavelength much longer than the largest dimension of the WPFT. It should be appreciated that RF signals with long wavelengths are effective for such applications, because they are easier to shield than signals with shorter wavelengths. In one embodiment, the transmission means may be identified as an air-core radio frequency transformer. For such transformers to efficiently transfer RF power, they are matched to the impedance of the external source and load impedance. In one embodiment, the source of external stimulus is the external RF power generator and the load is the heating elements(s) and/or electrode(s) to be operated on the WPFT. Impedances of 50 ohms are typical for the source, but impedances may range from a few ohms up to a few hundred ohms for the load(s). As will be appreciated, any impedance matching technique well known in the art can be used to match the transformer, but circuits that require only capacitors and the native inductance of the transformer coils can be made smaller than those circuits that include more elements.

In one embodiment, the energy transferred to the WPFT by inductive coupling is radio frequency alternating current whose frequency may range from hundreds of kilohertz to hundreds of megahertz. This RF AC (radio frequency alternating current) may be used directly for some embodiments of the WPFT, specifically those embodiments comprising at least one heating element. For such RF loads, the signal should be transmitted between the transformer secondary coil on the WPFT and the load by a RF transmission line to minimize radiation and to maintain the proper load impedance. If the load requires DC rather than AC, then a rectifier and possibly other electronic circuitry described above would be necessary to convert the energy into the required form.

In another embodiment, is provided a method of changing a functionality of an optical article. The method includes exposing the optical article to an external stimulus. The optical article includes an electrically responsive layer being configured to transform from a first optical state to a second optical state upon exposure to the external stimulus. The electrically responsive layer is configured to transform from a first optical state to a second optical state upon exposure to an external stimulus, and is capable of irreversibly transforming the optical article from the pre-activated state of functionality to the activated state of functionality. The electrically responsive layer includes a binder material, an electrically responsive material, an electrolyte and at least two electrodes in electrical communication with the electrically responsive layer, wherein the electrodes are in electrical communication with the same surface of the electrically responsive layer. The electrically responsive layer functions as means for rendering the optical article unreadable upon unauthorized activation.

In an additional embodiment, the method of changing the functionality of the optical article further includes subjecting the electrically responsive material to a time-dependent voltage profile or a time-dependent electrical stimulus. In still another embodiment, the method of changing the functionality of the optical article comprises an optical article which my include a tag comprising at least one pair of electrodes in contact with the optical article such that the electrodes are in electrical communication with the electrochemically responsive layer. The method of changing the functionality may further include sending a signal from an activation system to the tag, followed by applying an electrical stimulus to the electrical circuitry of the tag to generate a time-dependent voltage profile, and subjecting the electrochemically responsive layer to the time-dependent voltage profile, resulting in the electrically responsive material transforming from the first optical state of functionality to the second optical state of functionality. As discussed above, in various embodiments, the electrical communication between the electrodes and the optical article may be achieved by direct physical contact or by an indirect contact such via a connecting wire.

Still another embodiment of the present disclosure is directed to an activation system for transforming an optical article from a pre-activated state of functionality to an activated state of functionality. The activation system includes an optical article. The optical article includes at least one data side and an electrically responsive layer having a first surface and a second surface, wherein the electrically responsive layer is characterized by an optical absorbance in the range of about 200 nm to about 800 nm. The electrically responsive layer is configured to transform from a first optical state to a second optical state upon exposure to an external stimulus, and is capable of irreversibly transforming the optical article from the pre-activated state of functionality to the activated state of functionality. Furthermore the activation system includes at least two electrodes in electrical communication with the electrically responsive layer, wherein the electrodes are in electrical communication with the same surface of the electrically responsive layer. The activation system also includes an activation device for applying the external stimulus to the optical article to effect a change in at least one optical property of the optical article and thereby activating the optical article, wherein the activation system is operably coupled to the optical article through a communication device, wherein the communication device provides an activation signal to the activation device to permit activation of the optical article. In one embodiment, the communication device is configured to communicate with the activation device through a reader disposed outside the optical article.

Another exemplary embodiment is the electrical activation system for transforming an optical article from a pre-activated state of functionality to an activated state of functionality. The system includes an optical article to be activated having an electrically responsive layer having optical absorbance in the range of 200 nm to 800 nm; an activation device such as a wirelessly powered flexible tag, operatively coupled to the optical article for applying an electrical stimulus to the optical article to effect a change in optical absorbance of the optical article and thereby activate the optical article; and a communication device such as an RFID reader disposed outside optical article and configured to communicate with the activation device for providing an activation signal to the activation device to permit activation of the optical article.

In certain embodiments, the first surface of the electrically responsive layer is disposed on the data side of the optical article. Furthermore, the optical article includes two or more electrodes disposed on the electrically responsive layer. The electrodes are operably coupled with the electrically responsive layer. In some embodiments, the electrodes are disposed on the same surface of the electrically responsive layer. For example, the electrodes may be disposed on the second surface of the electrically responsive layer. Alternatively, the electrodes may be disposed on the first surface of the electrically responsive layer; in this case, the electrodes will be sandwiched between the data side of the optical article and the electrically responsive layer. In other embodiments, the electrodes may be distributed on the two surfaces of the electrically responsive layer, with one or more electrodes being on the first surface and the rest of the electrodes being on the second surface of the electrically responsive layer. The electrodes provide electrical energy to the electrically responsive layer at the POS while an attempt is being made to activate the optical article. The electrodes may directly form connections with the activation source during activation to provide electrical energy to the electrically responsive layer.

Alternatively, the electrodes may be in electrical communication with the electrical circuitry located in the packaging of the optical article. In one embodiment, the electrical circuitry may draw upon a source for electrical energy such as a battery or charged capacitor in the packaging. At the POS the electrical circuitry in the packaging may then form electrical connections with the activation source, thereby providing the electrical energy for activation to the electrically responsive layer. In certain embodiments, the packaging and/or tag comprises an electrical circuit with a localized power source such as a battery configured to supply electrical energy to the electrically responsive layer, wherein the electrical circuit is stimulated by the external stimulus. In these embodiments, the battery is not directly stimulated by the external stimulus, but rather provides power to the electrically responsive layer when the electrical circuit is externally stimulated Another embodiment is an electrical activation system employing a WPFT. The WPFT may include any of a radio frequency circuit, a thermocouple, a light-emitting diode, a strain gauge, a sound detecting element, a diode, an antenna, a dipole, an electrical receiver, a photocell, a resistor, a capacitor, a rectifier, an integrated circuit, a surface mount resistor, a chip resistor, an electrode, a heating element, or any combination or multiples thereof.

In embodiments where the optical article employs a wirelessly powered flexible tag, the electrodes may be placed on any of the tag, the electrically responsive layer, or the optical article. In these embodiments, the electrodes are in physical and/or electrical contact with both the electrically responsive layer and the tag. The tag is responsible for providing electrical energy to the electrically responsive layer, thereby activating the optical article.

Although most of the embodiments are described with regard to an optical article, the use of the electrically responsive layer of the present technique is envisioned in other applications as well. For example, the electrically responsive layer of the present technique may be employed in other applications requiring change of color upon exposure to determined external stimulus. For example, the electrically responsive layer may be employed in windowpanes of vehicles. The layer may coat on the entire surface of windowpanes such that the color of the panes may be varied depending on the weather outside, for example. For example, the panes may be colored in a dark color in hot weather and converted to be more transparent in cold weather. Alternately, the electrically responsive layer may be patterned in predetermined form on the panes for aesthetic purposes. For example, the electrically responsive layer is provided with electrical connections such that electrical energy can be applied to the layer when a change in color of the panes is desired.

Figure 2:
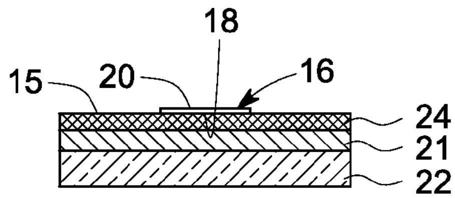
FIG. 2 is a cross-sectional side view of the optical article of FIG. 1 taken along line II-II.

Referring now to FIG. 1, an exemplary optical storage medium 10 includes a data storage region 12 and an inner hub 14. As illustrated in FIG. 2, the data storage region 12 includes an optical data layer 21, which stores the data, whereas the inner hub 14 is the non-data storage region of the optical storage medium 10. The medium 10 further includes a substrate 22 and a capping layer 24. The capping layer is typically transparent to the incident laser light. The capping layer 24 is used to protect the data in the medium 10 from getting damaged due to environmental factors. The optical storage medium 10 has an electrically responsive layer 16 disposed on the data side 15 of the medium 10. The electrically responsive layer 16 has a first surface 18 and a second surface 20. As illustrated, in the presently contemplated embodiment, the first surface 18 is disposed on the data side of the medium 10. The electrically responsive layer 16 may be disposed on different locations of the data side 15 such that the electrically responsive layer 16 covers at least a portion of the data storage region 12 in the pre-activated state of the optical storage medium 10.

The electrically responsive layer may interact with an external stimulus, such as electrical energy. The optical storage medium 10 upon interaction with the external stimulus undergoes an optical state change, whereby the optical absorbance of the electrically responsive layer 16 is altered, thereby changing the state of functionality of the optical storage medium 10. For example, in the pre-activated state of the optical storage medium 10, the electrically responsive layer 16 may be opaque to the incident laser light that is used to read the optical storage medium 10. That is, in the pre-activated state the electrically responsive layer may inhibit the incident laser light from reaching the optical data layer 21, whereas after interacting with the external stimulus the electrically responsive layer 16 may become transparent to the wavelength of the incident laser light as it is converted to an activated state.

Figure 3:
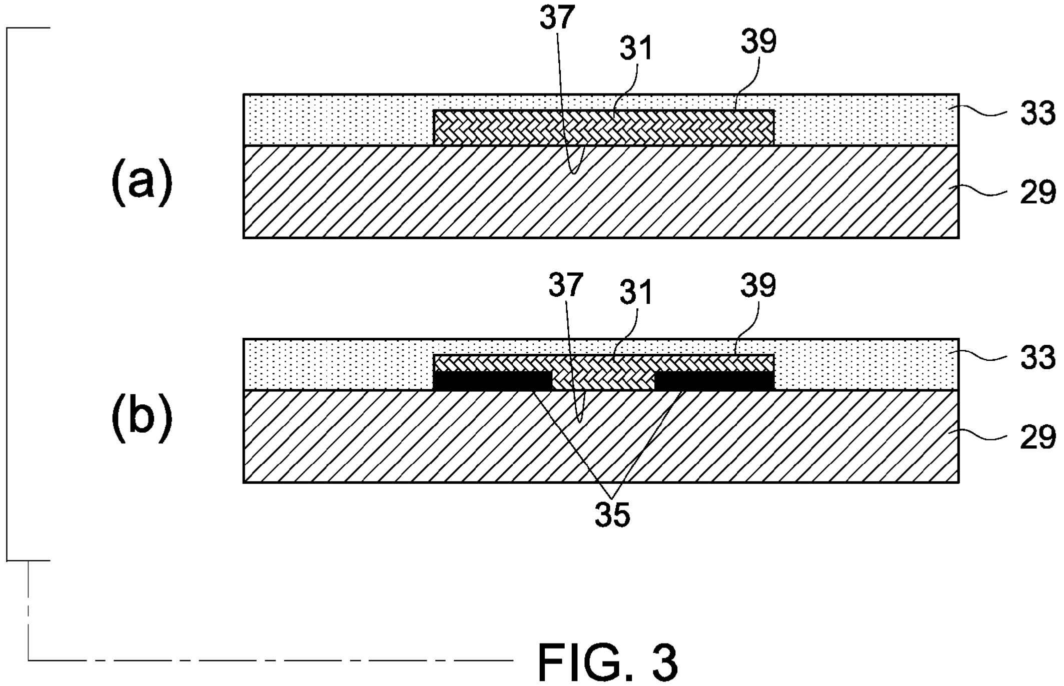
FIG. 3 is a cross-sectional side view of an optical article having an electrically responsive material and an optically transparent second layer disposed thereon.

As noted above, this change in the optical state may be caused by chemical changes within the electrically responsive layer 16, which are caused by exposure to the external stimulus. In the pre-activated state, the optical storage medium 10 may be unplayable or unreadable at least in the portions where the layer 16 is disposed. In other words, in the pre-activated state the electrically responsive layer 16 has a reflectivity of less than about 45 percent, or preferably less than about 20 percent, or more preferably less than 10 percent in the portions where the layer 16 is disposed. Upon interacting with an external stimulus, the optical storage medium 10 may be playable or readable. In other words, the electrically responsive layer 16 undergoes a change in reflectivity of at least 10 percent upon converting to the activated state FIG. 3*a* and FIG. 3*b* illustrate a simplified structure of an optical article 29 with an electrically responsive layer 31 disposed on the surface of the optical article. The electrically responsive layer 31 is disposed on the data side of the optical article 29 such that the first surface 37 of the electrically responsive layer is in contact with the surface of the optical article. An optically transparent second layer 33 is disposed over at least a portion of the electrically responsive layer 31 such that the second surface 39 of the electrically responsive layer is in contact with the optically transparent second layer 33. This optically transparent second layer 33 is used to protect the electrically responsive layer 31 from chemical and/or physical damage. Additionally, in FIG. 3*a*, the optically transparent second layer 33 is electrically conducting such that electrodes (not shown in figure) disposed on the optically transparent second layer maintain electrical contact with the electrically responsive layer 31. Alternately, in FIG. 3*b*, at least a pair of electrodes 35 are disposed on the surface of the optical article 29. The electrically responsive layer 31 is disposed such that at least a portion of the first surface 37 of the electrically responsive layer 31 is in physical contact with at least a portion of the electrodes 35 and the optical article 29. An optically transparent second layer 33 is disposed over at least a portion of the electrically responsive layer 31 such that the second surface 39 of the electrically responsive layer is in contact with the optically transparent second layer 33.

Figure 4:
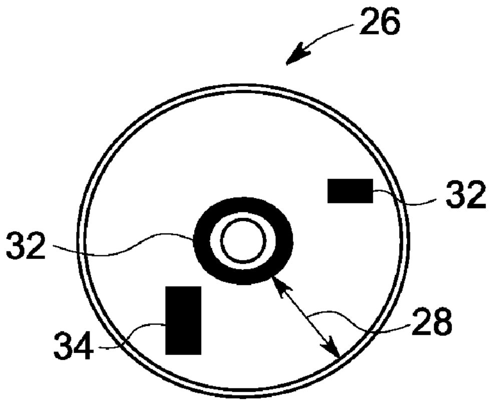
FIG. 4 is a schematic view of an optical article having an electrically responsive material disposed in a discrete area in accordance with another embodiment.

In an alternate arrangement, the optical storage medium 26 shown in FIG. 4 employs two electrically responsive layers 32 and 34. The medium 26 includes a data storage region 28 and an inner hub 30. In the pre-activated state of the optical storage medium 26, both the layers 32 and 34 may be opaque to the incident laser light thereby preventing the laser light from reading the data from the medium 26. Alternatively, one of the two layers 32 or 34 may be transparent to the incident laser light and the other layer may be opaque to the incident laser light. For example, layer 32 may be transparent to the incident laser light in the pre-activated state, whereas the layer 34 may be opaque to the incident laser light. In this case, the layer 32 is accompanied by a tailored menu, for example, which causes the medium 26 to be unplayable upon being read by the incident laser light. That is, if the data sector underneath layer 32 is readable by the DVD player, then special DVD authoring (programming) prevents the majority of the content (e.g., a movie) from being played. Accordingly, in the pre-activated state, when the layer 32 becomes opaque to the incident laser light, the tailored menu cannot be read, thereby authoring the medium 26 as readable.

Figure 5:
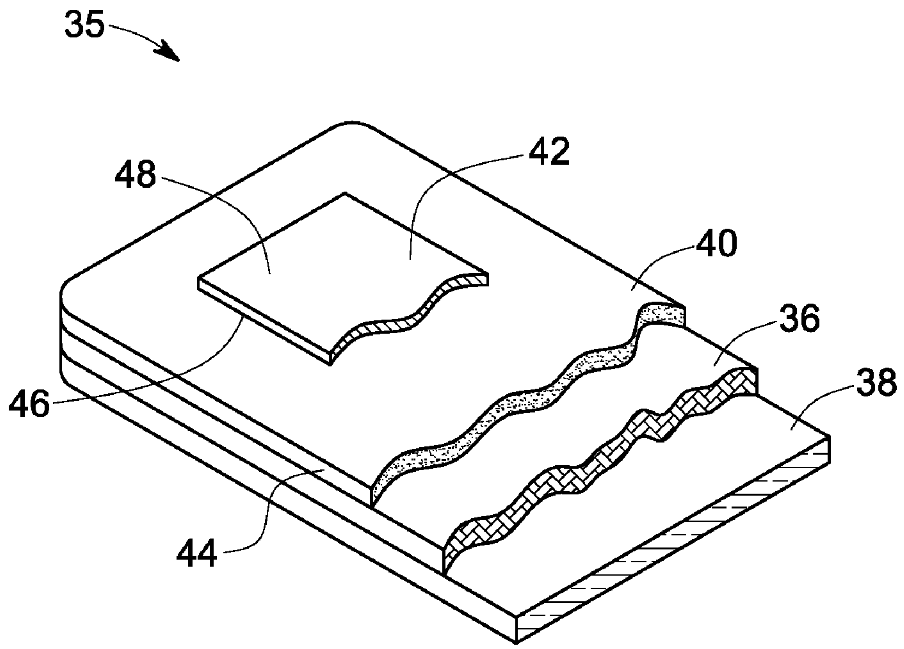
FIG. 5 is a partial perspective view of an identification card having an electrically responsive material disposed on an optical layer in accordance with an embodiment of the systems described herein.

FIG. 5 illustrates a simplified structure of an optical article, such as an identification (ID) card 35. As with the optical storage media 10 and 26, the ID card 35 includes an optical data layer 36 for storing data. The ID card 35 further includes a substrate 38 on which the optical data layer 36 is disposed. The substrate 38 may include a polycarbonate material. The optical data layer 36 is protected by a capping layer 40. As with the substrate 38, the capping layer 40 may also include a polycarbonate material. The capping layer 40 may be used to protect the optical data layer 36 from chemical and/or mechanical damages. The ID card 35 includes an electrically responsive layer 42 having a first surface 46 and a second surface 48. The layer 42 is disposed on the card 35 such that the first surface 46 of the electrically responsive layer 42 is disposed on the data side 44 of the card 35. In the pre-activated state, the electrically responsive layer 42 may prohibit the incident laser light from reaching to the optical data layer 36 and reading the data stored therein. However, after interaction with the external stimulus, the electrically responsive layer 42 may allow an incident laser light to pass through and reach the optical data layer 36, thereby allowing the reader to read the data stored in the optical data layer 36 of the card 35. The ID card 35 may be exposed to the external stimulus before issuing the ID card 35 to the concerned authority, thereby rendering the data in the optical data layer 36 readable by the incident laser light. By protecting the data in this manner before issuance of the ID card 35 to the concerned authority, the undesirable use of the card may be prevented in the event the card is stolen from the store where the card 35 was stored prior to issuance. The electrically responsive layer 42 may be disposed in different forms on the surface of the capping layer 40 or the optical data layer 36. For example, the electrically responsive layer 42 may extend across a portion of the capping layer 40, or may form a patterned layer extending across a portion of the capping layer 40, or may form a continuous film, throughout the capping layer 40. In an alternate arrangement, the electrically responsive layer 42 may be disposed at least partially within one or more of the optical data layer 36, substrate 38 or the capping layer 40.

As described with regard to FIGS. 1-5, the electrically responsive layer renders the optical article completely or partially unreadable in the pre-activated state of the functionality by changing the reflectivity of the optical article at certain locations. In the activated state of functionality of the optical article, the properties of the electrically responsive layer are changed from those in the pre-activated state by interacting the optical article with the external stimulus, as will be described below. Therefore, the optical article is ineffective in the pre-activated state.

Figure 6:
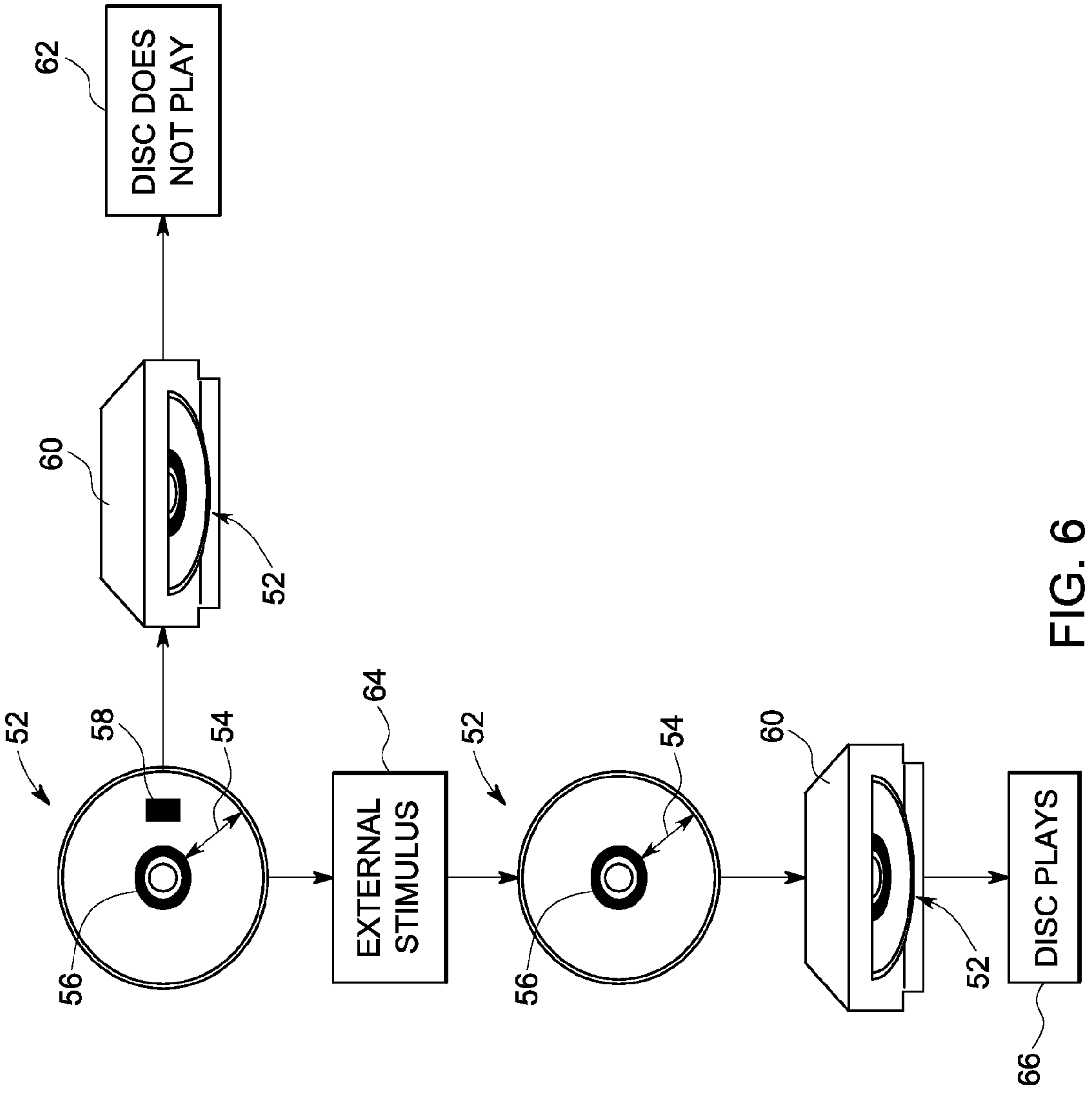
FIG. 6 is a diagrammatical representation of a method of operatively coupling an optical article with a wirelessly powered flexible tag in accordance with an embodiment of the techniques described herein.

FIG. 6 illustrates a method of changing a functionality of an optical article, such as optical storage medium 52. The method may be applied for other optical articles, such as an ID card, a payment card, a personal information card, and the like. As illustrated, the optical storage medium 52 includes a data storage region 54 and an inner hub 56. The data storage region 54 employs an electrically responsive layer 58 disposed in discrete portions. When inserted in an optical reader 60 prior to directing an external stimulus to it (pre-activated state), the optical storage medium 52 does not play, that is, the data in the optical data layer (not shown) of the optical storage medium 52 is unreadable (block 62). However, when interacted with an external stimulus 64, the optical-state change material alters the functionality of the optical storage medium 52 (activated state) as described above and renders it readable by the reader 60 (block 66).

The source for external stimulus may be built into a bar code reader, a radio frequency identification reader, an electronic surveillance article reader, like an acousto-magnetic tag detector or deactivator, such that when the optical article or the packaging having the optical article is swiped through the bar code reader, the optical-state change material is allowed to interact with the external stimulus and the state of the optical article is converted to the activated state. Furthermore, the source of the external stimulus may also be integrated with a hand-held wand or computer controlled electronic box at the checkout counter.

Additionally, the verification of the activation may be conducted on the optical article. The verification may be desirable either to: 1) identify the defaulting users, or 2) to confirm that the optical article was accurately activated at the first point of interaction, such as a point-of-sale. In some embodiments the verification may be conducted at a second location, such as the exit point of the storage location in office premises, a shop, or a store, that is to say, the activation of the optical article may be conducted just before the user leaves the premises of the shop or mall. In these embodiments, the security system installed at the exit locations may send out signals indicating whether or not the optical article is activated. Furthermore, a device may be installed in the security system, such that the device may interact with the optical-state change material in the optical article and make it permanently unreadable if the optical article was carried out without being activated.

In one embodiment, the electrically responsive layer may be disposed across a portion of the optical article, or in a patterned layer extending across a portion of the optical article. In various embodiments, the electrodes may be configured to provide effective electrical communication with the electrically responsive layer and thereby conduct the external stimulus to the electrically responsive layer. In one embodiment, the electrodes may extend along a length of the electrically responsive layer i.e., the electrodes may be essentially parallel to the electrically responsive layer. In another embodiment, the electrically responsive layer and the electrodes may be interdigitated. In yet another embodiment, each of a pair of electrodes may be adjacent to one end of a portion of the electrically responsive layer. In still yet another embodiment, each of a pair of electrodes may be disposed in the plane of the electrically responsive layer.

As will be described in detail below, the activation element is a multi-component structure having one or more devices, such that the devices may receive energy from the external stimulus in one form and convert it into another form. The converted form of energy is then utilized by the activation element to interact with the electrically responsive layer to change the state of functionality of the optical article. For example, the optical-state change material may be in operative association with a multi-component structure which could comprise a radio frequency (RF) circuitry, coupled to electrodes and which may react with an external stimulus, such as radio frequency waves, or microwaves, and convert it into electrical energy. The electrical energy may then be utilized by the electrically responsive layer to change the functionality of the optical article from the pre-activated state to the activated state, as will be described in detail below with regard to FIGS. 7-15.

Figure 7:
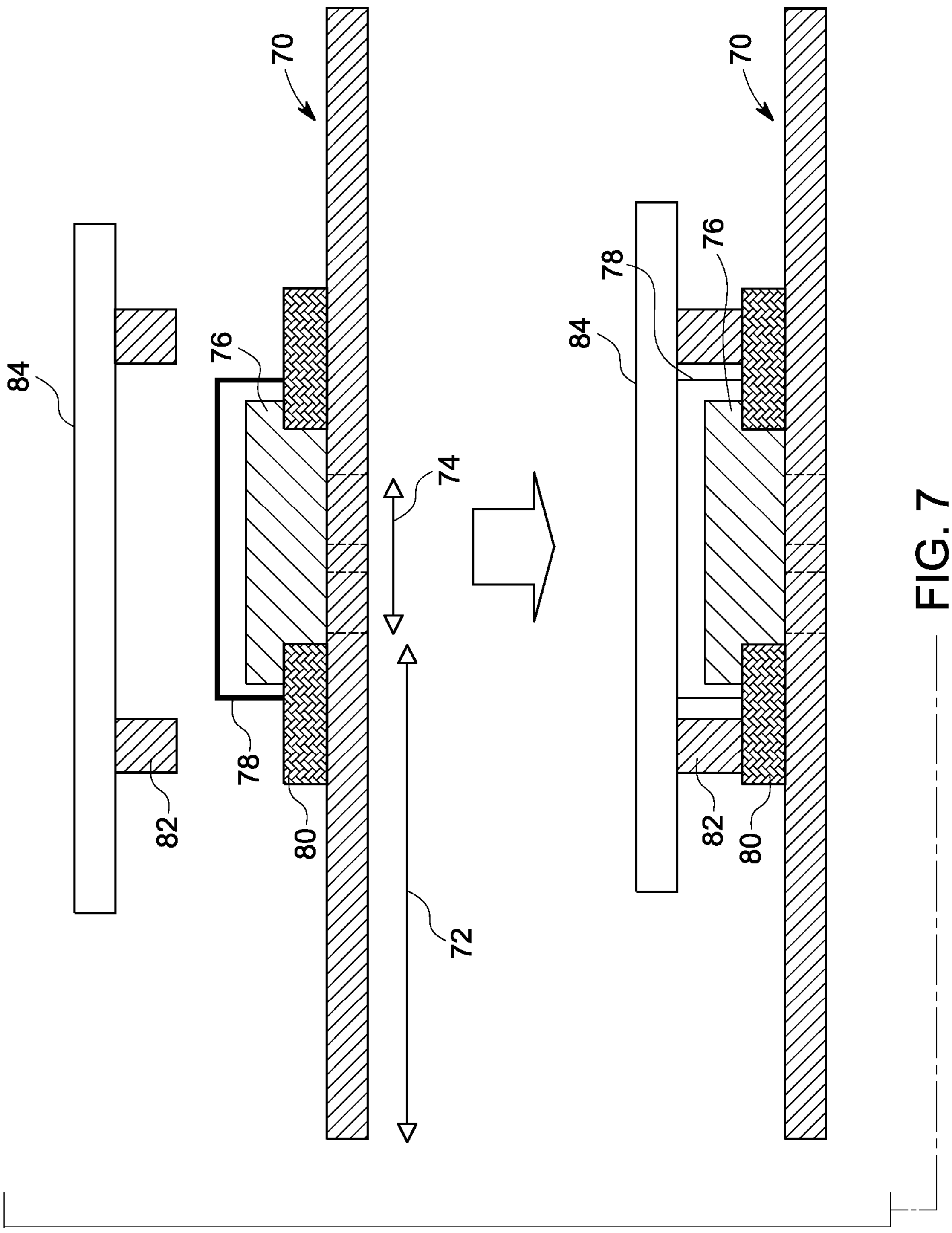
FIG. 7 is a schematic view of a method for changing a functionality of an optical article having the electrically responsive layer and the electrodes in accordance with embodiments of the systems and techniques described herein.

Referring to FIG. 7, a method of operatively coupling an optical article 70 with a wirelessly powered flexible tag 84 is provided. The optical article 70 includes a data storage region 72 and an inner hub area 74. The electrically responsive layer 76 is disposed on the optical article 70 such that a portion of the electrically responsive layer 76 is disposed on the data storage region 72, so as to prevent the read laser light from reading the data from the optical article 70 in the pre-activated state. Furthermore, an optional transparent protective coating 78 is disposed on the electrically responsive layer 76. The coating 78 prevents the electrically responsive layer 76 from physical damage, such as scratches, or from chemical damage, for example from exposure to environmental conditions such as changes in temperature or humidity. The electrically responsive layer 76 is disposed on the optical article 70 such that at least a portion of the electrically responsive layer 76 overlaps with a pair of electrodes 80. In one example, the electrodes include indium tin oxide (ITO). As will be appreciated, ITO is generally transparent to the read laser light, hence, does not interfere with the read laser light in the activated state of the device. In one example the electrodes are comprised of a transparent conductive polymer. In another example, the electrodes are comprised of a non-transparent conductive metal such as aluminum, but the design or size (length and width) of the electrodes is such that it does not appreciably interfere with the read laser light in the activated state of the device. (That is, there is no loss of data). Furthermore, the tag 84 includes a pair of electrically conductive pads 82. The pads 82 are disposed on the tag 84 such that when the tag 84 is placed on the coating 78, the pads come in contact with the electrodes 80, thereby completing the electrical circuit between the tag 84 and the coating 76. In one example, the pads 82 are disposed on the tag 84 such that when the tag 84 is placed on the coating 78, the pads come in contact with either the electrically responsive layer 76 or the protective coating 78. In this example, the electrodes 80 are not necessary. When the tag 84 is exposed to the external stimulus, the electrical energy from the tag is transferred to the electrically responsive layer 76 via the pads 82 and the electrodes 80. As a result the electrically responsive layer 76 changed from a first optical state to a second optical state.

Figure 8:
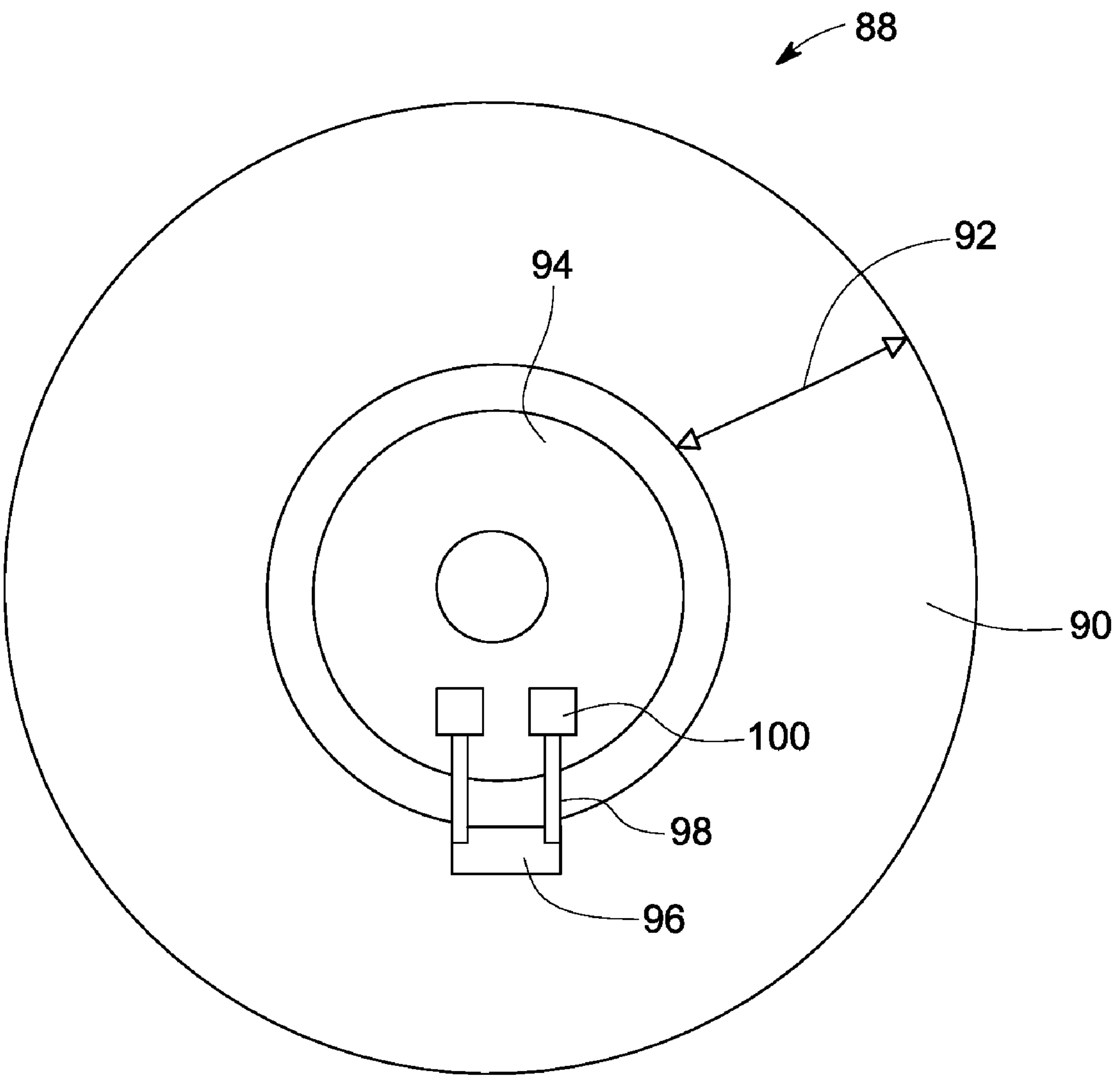
FIG. 8 is a schematic view of an optical article employing an electrically responsive layer in accordance with an embodiment of the systems and techniques described herein.
Figure 9:
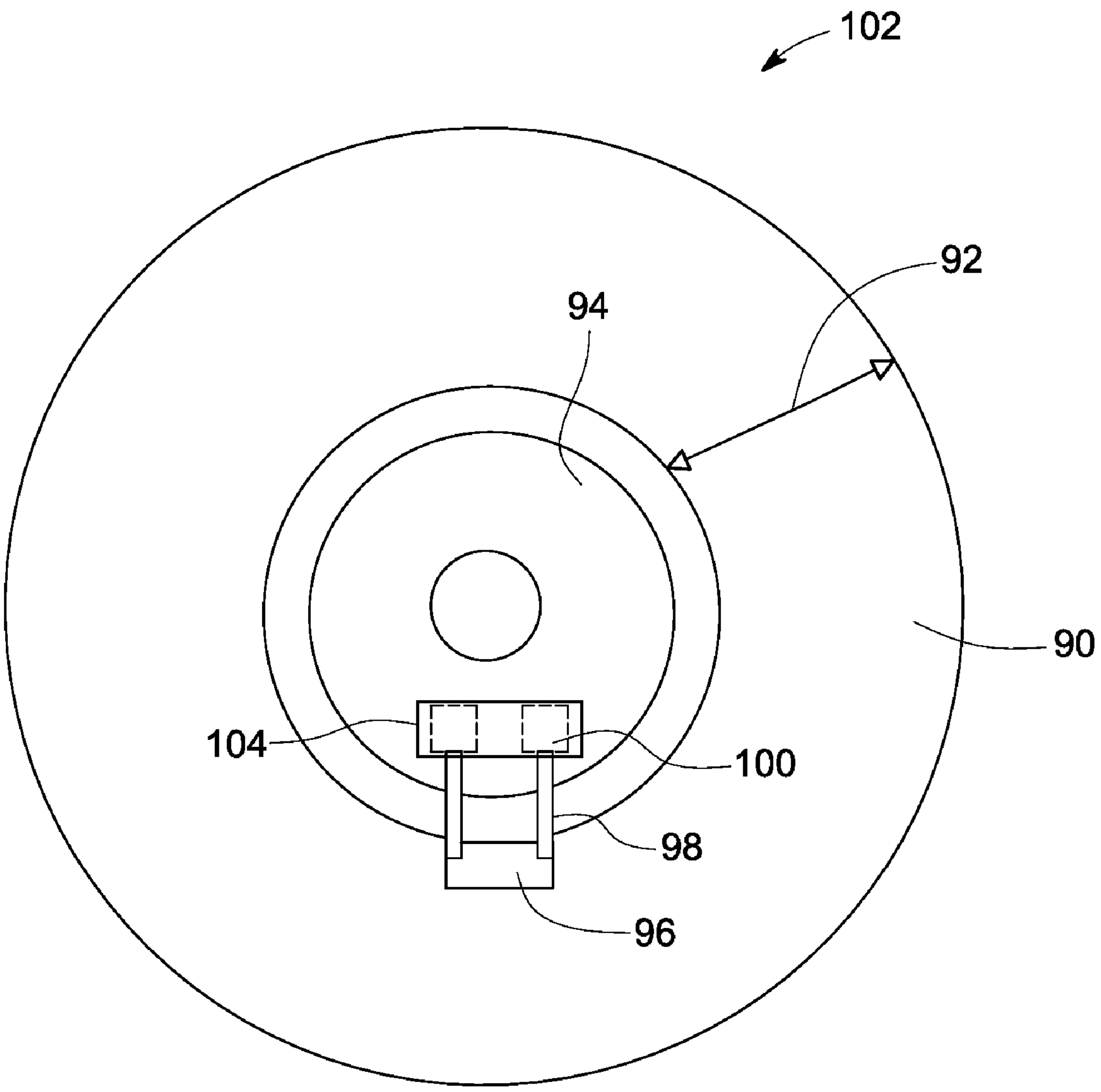
FIG. 9 is a schematic view of an optical article employing an electrically responsive layer and a wirelessly powered flexible tag in accordance with an embodiment of the systems described herein.

FIG. 8 illustrates an embodiment where the electrodes 98 are in the plane of the optical article 88. The optical article 88 includes a data storage region 92 and an inner hub area 94. Furthermore, in the illustrated embodiment, a transparent protective coating 90 is provided on the data storage region 92, the electrically responsive layer 96, and a portion of the electrodes 98. In this embodiment, a wirelessly powered flexible tag 104, as illustrated in FIG. 9, may be coupled to the optical article. The tag 104 makes electrical contacts with the electrical pads 100 located on the inner hub area 94 of the disc by means of electrical pads disposed on the tag (not shown in figure).

Figure 10:
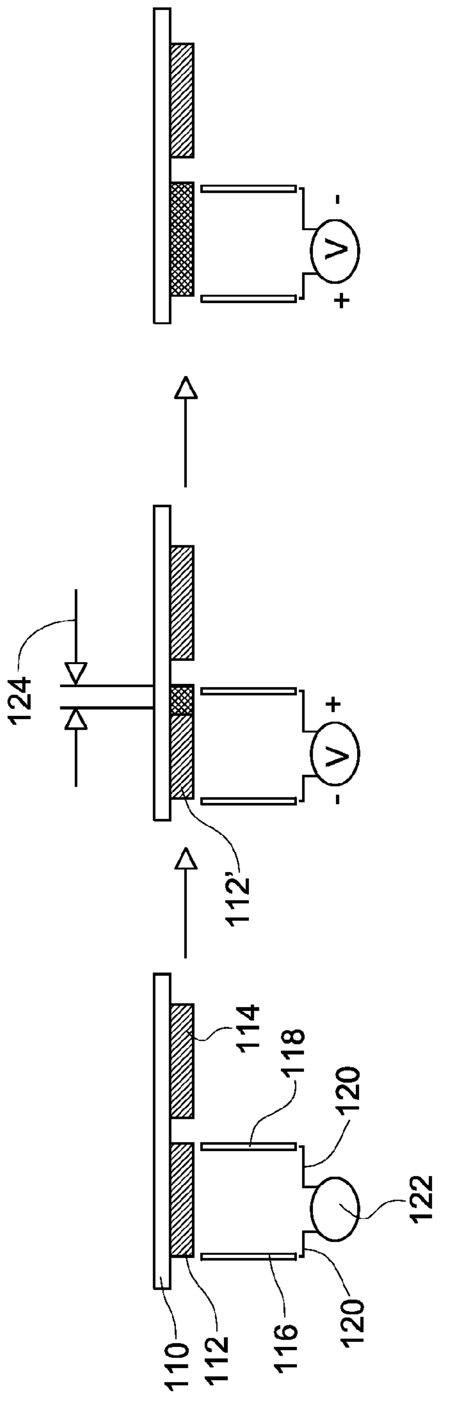
FIGS. 10 to 15 are diagrammatical representations of alternate embodiments of methods of changing a functionality of an optical article by transforming the electrically responsive layer from a first optical state to a second optical state in accordance with embodiments of the systems and techniques described herein.

FIG. 10 illustrates a side view of an optical article 110 employing two electrically responsive layers 112 and 114. The layer 112 is connected to a voltage supply 122 via the electrodes 116 and 118 and connectors 120. Although, in the illustrated embodiment, the electrodes 116 and 118 are shown to be about perpendicular to the surface of the optical article 110, it should be noted that the relative angle of the electrodes and the optical article 110 may be varied depending on the design criterion. For example, as will be discussed with regard to FIGS. 14 and 15, the electrodes may be essentially parallel to the surface of the optical article. At a given time one of the two layers 112 and 114 are supplied the voltage to convert the electrically responsive layers 112 and 114 from the first optical state to the second optical state. With both the electrodes being on one side of the electrically responsive layer 112, state transformation or bleaching occurs only at positive electrode 118. For example, in the illustrated embodiment, when the electrically responsive layer 112 is subjected to a voltage with a first polarity, only a portion 124 of the topical coating of the electrically responsive layer 112' becomes transparent to the incident laser light. The article 110 may not be readable with just the portion 124 of the electrically responsive layer 112 being transparent to the incident laser light. Hence, upon changing the polarity, i.e., upon reversing the polarities of the electrodes 116 and 118. In other words, upon making the electrode 116 as the positive electrode, the rest of the portion of the layer 112' is transformed from a first optical state to a second optical state. The same steps may then be applied to the electrically responsive layer 114 to transform the electrically responsive layer 114 from the first optical state to the second optical state. The electrodes may be a part of a wirelessly powered flexible tag. At the POS, each of the layers 112 and 114 may be transformed from the first optical state to the second optical state within a time period of about 1 second to about 30 seconds.

Instead of employing a single pair of electrodes, more than two electrodes may be employed to activate the optical article. In these embodiments, interdigitated electrodes or multiple pairs of electrodes may be energized simultaneously or sequentially as will be described with regard to FIGS. 14 and 11, respectively. Furthermore, the pattern of the electrodes needs to be mapped to the pattern formed by the electrically responsive layers in such a way that enough of the disc is unobscured.

Figure 11:
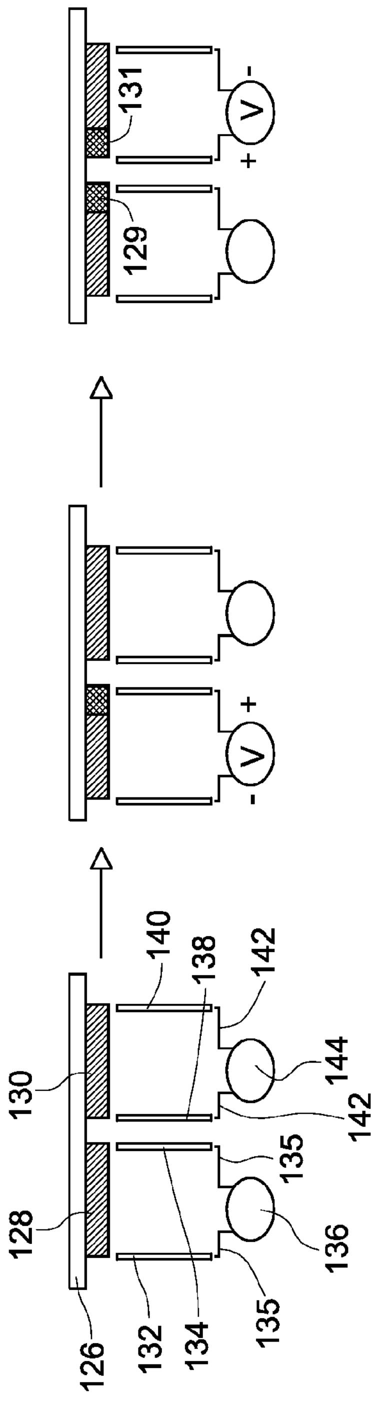

Referring to FIG. 11, the optical article 126 includes electrically responsive layers 128 and 130 having separate pairs of electrodes. The electrically responsive layer 128 employs electrodes 132 and 134, and the electrically responsive layer 130 employs electrodes 138 and 140. Both pairs of electrodes are separately connected to respective voltage sources 136 and 144 using the connections 135 and 142, respectively. In the illustrated embodiment, the voltages to the two electrically responsive layers 128 and 130 are applied sequentially. It should be noted that the optical article 126 is readable if a small fraction of the electrically responsive layer (such as layer 128 or 130) remains in the 650 nm absorbing state. Generally, the optical article will be playable (activated) if the electrically responsive layer is patterned in an arc or series of spots with length along the direction of the data spiral of less than about 5 mm, more preferably less than 4 mm and even more preferably less than 3 mm. Accordingly, when the portions 129 and 131 are bleached upon application of voltages, the optical article 126 becomes playable.

Figure 12:
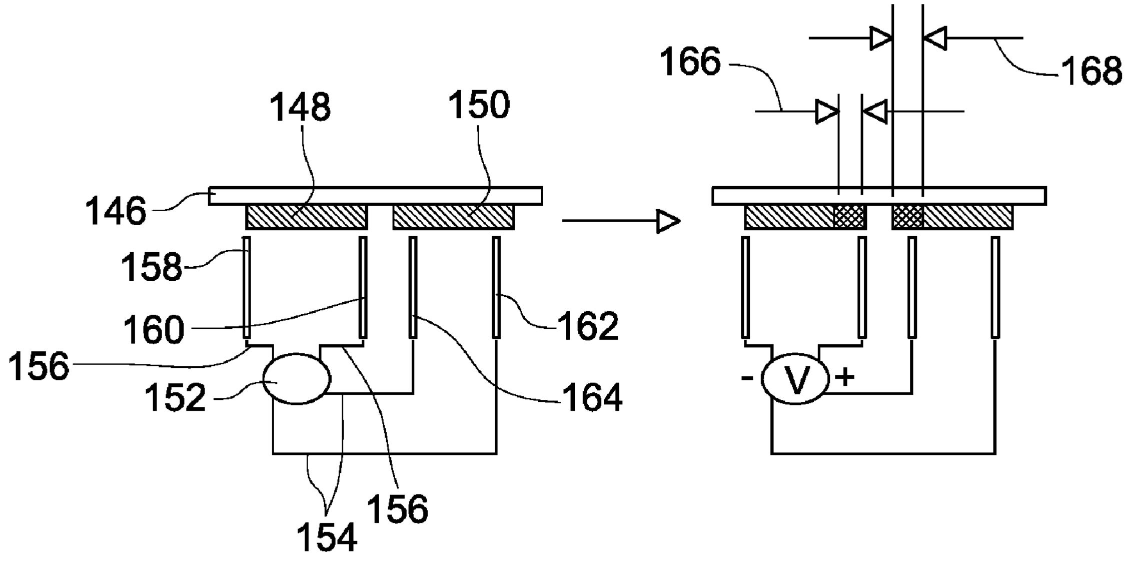
Figure 13:
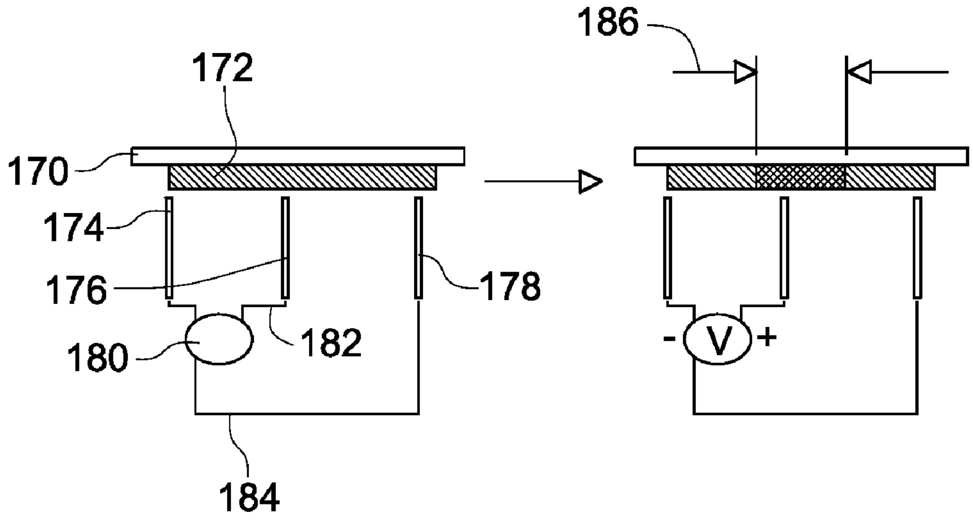

FIG. 12 illustrates an optical article 146 employing two electrically responsive layers 148 and 150. The electrically responsive layers 148 and 150 are electrically connected to a common voltage source 152 through electrical connectors 154 and 156 and electrodes 158, 160, 162 and 164. When the voltage is applied to the two layers 148 and 150, the portions 166 and 168 of layers 148 and 150, respectively, are simultaneously transformed, thereby making the optical article 146 readable FIG. 13 illustrates yet another embodiment of an electrically responsive layer 172 is operatively coupled with the optical article 170. As illustrated, the electrically responsive layer 172 is in the form of a continuous topical coating. Electrodes 174, 176 and 178 are coupled to the electrically responsive layer 172 at three different locations. The three electrodes 174, 176 and 178 form two pairs of electrodes that are commonly connected to the voltage source 180 using the connectors 182 and 184. Furthermore, when a voltage is applied to the electrodes, the polarity of the middle electrode 176 is kept positive, such that the portion 186 of the optical article 170 becomes transparent to the incident laser light. In an alternate arrangement to the illustrated embodiment, the electrode configuration of FIG. 13 may be employed electrically responsive layer 172. In this arrangement, four electrodes instead of three of the current configuration, may be located at four different locations of the electrically responsive layer 172, such that the middle two electrodes are kept at positive polarity, which will result in at least a portion of the layer 172 lying between the two middle electrodes being bleached.

Figure 14:
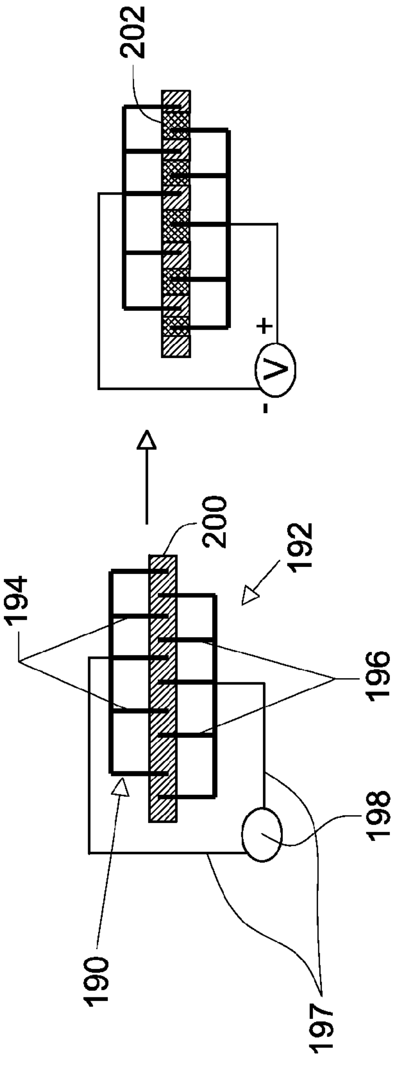
Figure 15:
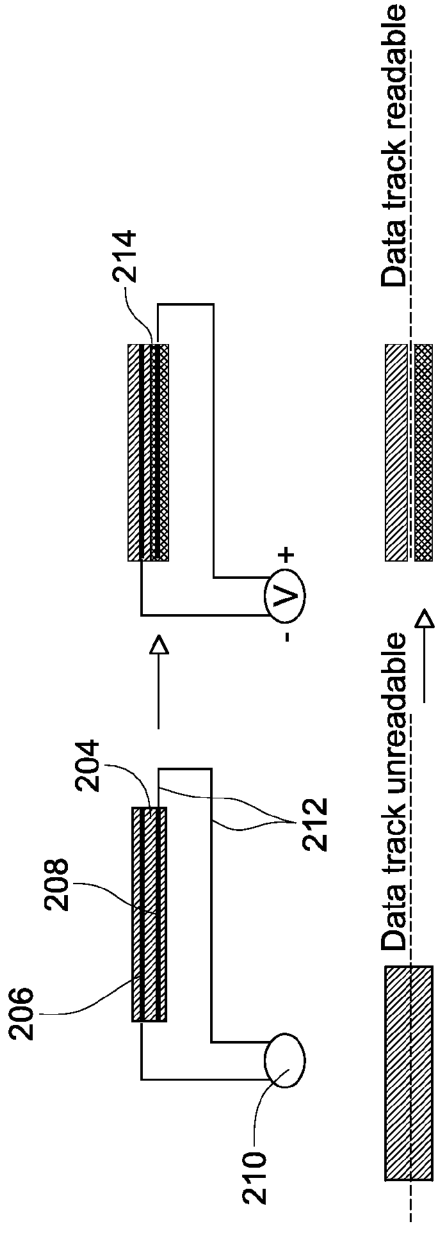

FIGS. 14 and 15 illustrate two embodiments where the electrodes are disposed parallel to the surface of the optical articles (not shown). In these illustrated embodiments, the electrodes are in contact with the electrically responsive layer and may be initially coupled to either the optical article or the wirelessly powered flexible tag. In these embodiments, the wirelessly powered flexible tag may be employed to provide the electrical energy to the electrically responsive layer via the electrodes.

FIG. 14 is a top view of an optical article (not shown in figure) illustrating an interdigitated configuration. The interdigitated electrodes are formed from two sub-parts 190 and 192. Each of the sub-parts 190 and 192 include plurality sub-electrodes 194 and 196, respectively. The sub-parts 190 and 192 are arranged such that the sub-electrodes 194 and 196 are interwoven on the electrically responsive layer 200. The two sub-parts 190 and 192 are coupled to a common electrical source 198 via the connectors 197. Upon application of electrical potential, the portions 202 of the electrically responsive layer 200 close to the positive electrodes (196) is converted from a first optical state to a second optical state, thereby making the optical article readable.

Referring now to FIG. 15 the optical article (not shown) employing electrodes 206 and 208 parallel to the surface of the optical article in contact with an electrically responsive layer 204. The electrodes 206 and 208 are coupled to the source 210 of electrical potential through the connectors 212. Upon application of the electric potential, a portion 214 of the electrically responsive layer is transformed from a first optical state to a second optical state, thereby making the optical article readable.

Figure 16:
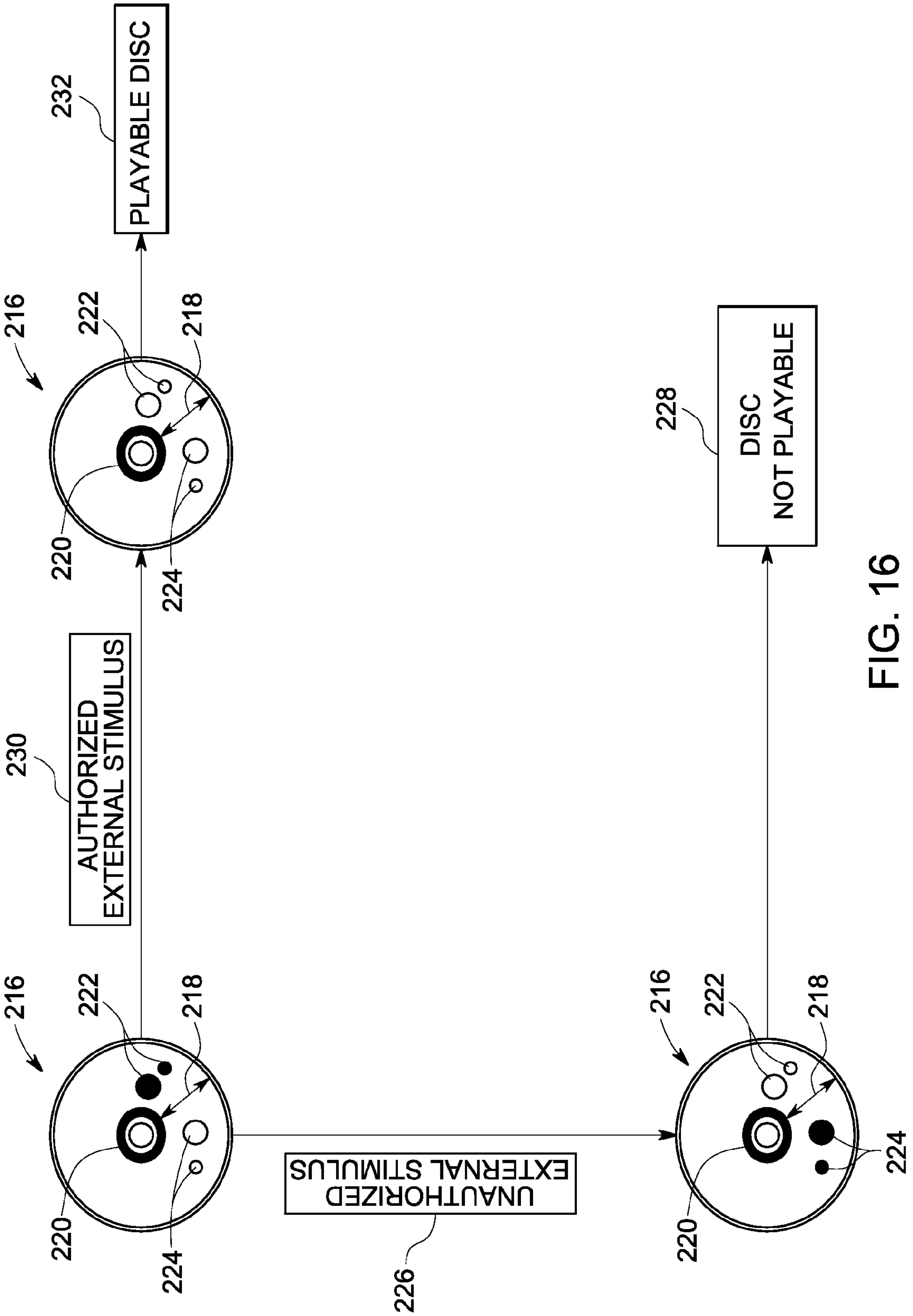
FIG. 16 is a diagrammatical representation of a method for inhibiting unauthorized activation of an optical article in accordance with an embodiment of the techniques described herein.

FIG. 16 illustrates a method for preventing unauthorized activation attempts of an optical storage medium 216. The method may be applied for other optical articles, such as an ID card, a payment card, a personal information card, and the like. As illustrated, the optical storage medium 216 includes a data storage region 218 and an inner hub 220. The optical storage medium 216 has one kind of electrically responsive layers 222 disposed in discrete portions of the medium 216. In pre-activated state, the optical storage medium 216 does not play, that is, the data in the optical data layer (not shown) of the optical storage medium 216 is unreadable. However, when interacted with an authorized external stimulus 230, the electrically responsive layers 222 alter the functionality of the optical storage medium 216 (activated state) as described above and render it to a playable state 232. When attempts are made to activate the optical storage medium 216 using an unauthorized external stimulus 226. For example, some one stealing the optical storage medium 216 and using an electrical energy source to activate the optical storage medium 216, the second electrically responsive layer 224 changes its optical absorbance and irreversibly converts the optical storage medium 216 to an unplayable state 228 as discussed above.

EXAMPLES

Example 1

Provides Electrically Responsive Ink Compositions and a Method for Preparing the Same Stock Solution 1: Lithium perchlorate (LiClO4, Alrich, CAS 7791-03-9) was dissolved in a mixture of polyethylene glycol (600) diacrylate (SR610, Sartomer), trimethylolpropane triacrylate (SR351, Sartomer), polyethylene glycol 400 (PEG-400, Fluka, CAS 25322-68-3) and propylene carbonate (PC, Aldrich, CAS 108-32-7) by stirring at room temperature for 24 hours (see Table 1 for quantities). To the mixture was added bromocresol green (BCG, Aldrich, 76-60-8) resulting in an orange solution. A small amount of JEFFAMINE ED-900 Polyetheramine (XTJ-501, Huntsman) was added to the mixture to adjust the pH of the stock till the solution attained a blue color.

Sample 1A: A 20 milliliter (ml) vial was charged with 7.22 grams (g) of Stock Solution 1 and 0.33 g (1.7 millimoles (mmol)) of biphenol (Aldrich, CAS 92-88-6). The mixture was stirred at room temperature (about 20° C.) for 2 hours to yield a homogenous blue solution.

Sample 1B: A 20 mL vial was charged with 6.26 g of Stock Solution 1 and 0.18 g (1.6 mmol) of m-cresol (Aldrich, CAS 108-39-4). The mixture was stirred at room temperature (about 20° C.) for approximately 2 hours to yield a homogenous blue solution.

Stock Solution 2: Lithium perchlorate (LiClO4, Aldrich, CAS 7791-03-9) was dissolved in a mixture of polyethylene glycol (600) diacrylate (SR610, Sartomer), trimethylolpropane triacrylate (SR351, Sartomer), polyethylene glycol 400 (PEG-400, Fluka, CAS 25322-68-3) by stirring at about 40° C. for 48 hours (see Table 1 for quantities). To the mixture was added bromocresol green (BCG, Aldrich, 76-60-8) resulting in an orange solution. A small amount of JEFFAMINE ED-900 Polyetheramine (XTJ-501, Huntsman) was added to the mixture to adjust the pH of the stock such that the solution was blue in color.

Sample 2A: A 20 ml vial was charged with 6.20 g of stock solution 2 and 0.29 g (1.5 mmol) of biphenol (Aldrich, CAS 92-88-6). The mixture was stirred at about 40° C. for 24 hours to yield a homogenous blue solution.

Sample 2B: A 20 ml vial was charged with 6.17 g of stock solution 2 and 0.17 g (1.6 mmol) of m-cresol (Aldrich, CAS 108-39-4). The mixture was stirred at room temperature (about 20° C.) for approximately 2 hour to yield a homogenous blue solution.

TABLE 1

| Stock Solution | SR610 (g) | SR351 (g) | PEG-400 (g) | PC (g) | $LiClO_4$ (g) | BCG (g) | Darocur 1174 (g) | XTJ-501 (g) |
|---|---|---|---|---|---|---|---|---|
| 1 | 1.65 | 3.15 | 4.35 | 4.5 | 0.9 | 0.045 | 0.45 | 0.05 |
| 2 | 2.4 | 4.65 | 6.6 | 0 | 0.9 | 0.045 | 0.45 | 0.05 |

Thin films of samples 1A-1B and 2A-2B were prepared as follows: A small amount of each solution (about 1 drop) was draw coated onto patterned surface electrodes (0.1 micrometer of titanium, 4 micrometer of copper, 1 micrometer of nickel, and then 1 micrometer of gold on the surface of Kapton film) using a mask approximately 45 micrometer thick and immediately subjected to a 3 s pulse of intense UV exposure using a Xenon Corp (RC-747, Wilmington, Mass.) UV cure lamp filtered through a 500 nm line per-inch Ronchi Ruling filter (EO Edmund Industrial Optics, Barrington, N.J.) resulting in a blue film approximately 45 micrometer thick.

Thin films of samples 1A-1B and 2A-2B were electrolyzed as follows: The blue films of sample 1A-1B and 2A-2B were subjected to a voltage (current less than 1 milliampere) using the patterned surface electrodes with a length of 3 mm and a gap between the electrodes of 1 mm. The blue film turned yellow on the surface of the positive electrode (anode). The percent reflectivity of the film was measured at 650 nm using an Ocean Optics USB2000 fiber optic spectrometer throughout the electrolysis experiment. See Table 2 for details pertaining to the voltage magnitude (E), time of the applied voltage (t) and percent reflectivity before applying the voltage (percent reflectivity (percent R) initial) and the percent reflectivity after the voltage was applied (percent reflectivity (percent R) final).

TABLE 2

| Sample | E (V) | Time (s) | Percent R initial | Percent R final |
|---|---|---|---|---|
| 1A | 20 | 5 | 19 | 64 |
| 1A | 40 | 5 | 18 | 66 |
| 1B | 40 | 60 | 26 | 56 |
| 1B | 40 | 5 | 20 | 63 |
| 2A | 40 | 5 | 21 | 58 |
| 2B | 40 | 190 | 14 | 59 |

Figure 17:
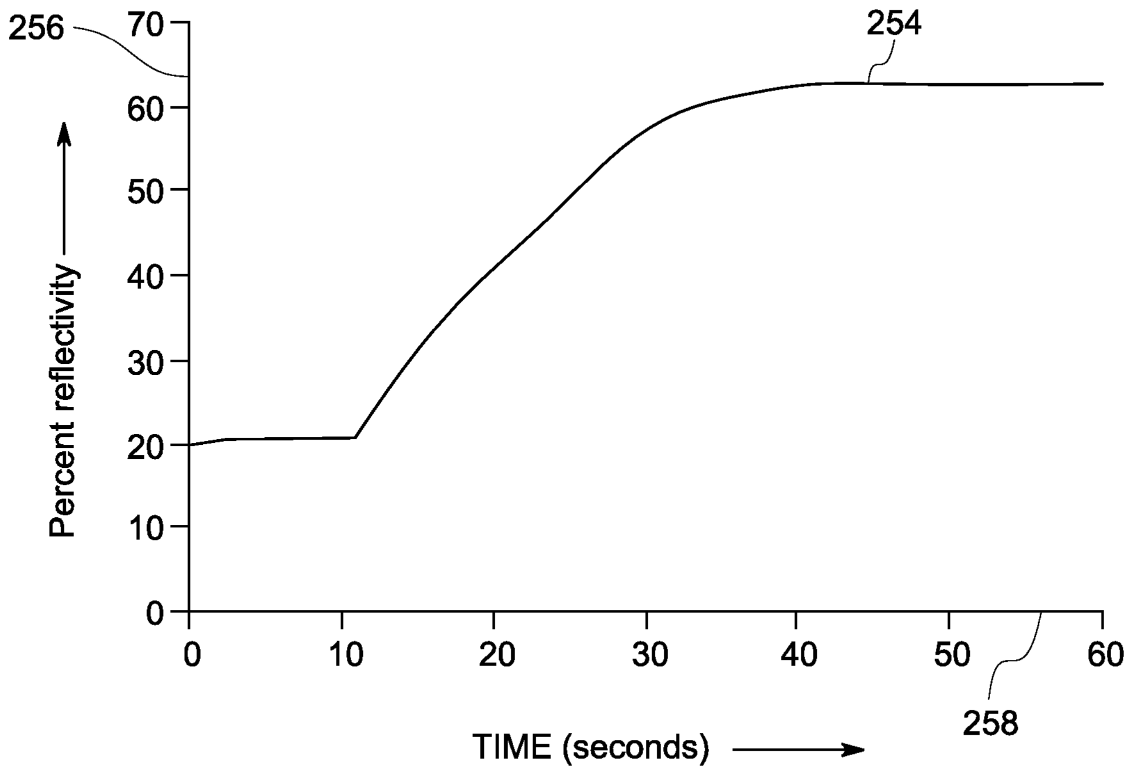
FIG. 17 is a graphical representation illustrating a change in the percent reflectivity of an optical article as a function of time in accordance with an embodiment of the systems and techniques described herein.

The change in the percent reflectivity (256) at 650 nm as a function of time (258) in film 1B upon applying 40 V for 5 seconds is shown in graphical representation 254 in FIG. 17. The voltage was started at t equal to 10 seconds.

Example 2

Provides a Method for Preparing a Polymer Gel Electrolyte Stock Solution

Lithium perchlorate ($LiClO_4$, Aldrich, CAS 7791-03-9) was dried by heating under vacuum to remove any water. 2.57 g of the dried $LiClO_4$ and 6 g of poly(methyl methacrylate) (PMMA, Mw 350,000, Aldrich, CAS 9011-14-7) were added to 17.14 g anhydrous propylene carbonate (PC, Aldrich, 108-32-7) and 60 g of anhydrous acetonitrile (MeCN) that was dried over calcium hydride and distilled. The mixture was stirred under a nitrogen atmosphere at room temperature (about 20° C.) for 16 hours at which point all solids were dissolved. The resultant polymer gel electrolyte stock solution obtained had the following composition: MeCN/PC/PMMA/$LiClO_4$ (70/20/7/3 weight percent based on the weight of the ink composition).

Example 3

Provides an Electrically Responsive Ink Composition Prepared Using the Polymer Gel Electrolyte Stock Solution Prepared in EXAMPLE 2 and a Method for Preparing the Same A 1.5 weight percent mixture of 2,3-dihydrothieno[3,4-b]-1,4-dioxin (EDOT) in the polymer gel electrolyte was prepared by adding 0.019 g of EDOT (Aldrich, CAS 126213-50-1) to 1.24 g of the polymer gel electrolyte stock solution and stirred at room temperature. A thin film of this mixture was prepared between two indium-tin-oxide (ITO) coated glass slides (Delta Technologies Inc.) by the following method. One drop of this mixture was placed on one ITO slide and allowed to dry in an ambient atmosphere for 5 minutes. A second ITO slide was placed on top of the polymer gel electrolyte creating a transparent thin film (about 50 micrometer thick) between the two ITO plates and allowed to dry overnight at room temperature. The thin film was then electrolyzed by applying 3 V DC for 10 seconds and the percent reflectivity at 650 nm was monitored using an Ocean Optics USB2000 fiber optic spectrometer throughout the electrolysis experiment. The percent reflectivity was 100 percent before the voltage was applied. After applying 3V to the film for 10 seconds the percent reflectivity reduced to 43 percent and the film was dark blue in color.

Example 4

Provides Electrically Responsive Ink Composition Prepared Using the Polymer Gel Electrolyte Stock Solution Prepared in Example 2 and a Method for Preparing the Same A 0.1 weight percent mixture of methyl green (MG, Vendor, CAS 7114-03-6)) in the polymer gel electrolyte was prepared by adding 0.015 g of MG to 15 g of the polymer gel electrolyte stock solution and stirred. One drop of this mixture was placed on a glass slide coated with ITO (Delta Technologies Inc.) and allowed to dry in an ambient atmosphere for 5 minutes. A second ITO coated slide was placed on top of the polymer gel electrolyte mixture creating a blue colored thin film (about 50 micrometer thick) between the two ITO plates and allowed to dry for 16 hours at room temperature. The thin film was electrolyzed by applying 3.5 V DC for 30 seconds and the percent reflectivity at 650 nm was monitored using Ocean Optics USB2000 fiber optic spectrometer throughout the electrolysis experiment. The percent reflectivity was 13 percent before the voltage was applied. After applying 3.5 V to the film for 30 seconds, the percent reflectivity was 60 percent and the film was yellow in color.

Example 5

Provides an Electrically Responsive Ink Composition and an Electrically Responsive Layer and Methods for Preparing the Same To a 20 ml vial was added 1 g of a 30 weight percent solution of poly(ethyl methacrylate) (Mw 10K, Elvacite 2043, CAS 9011-14-7) in Dowanol PM (DPM, Aldrich, CAS 107-98-2), 0.653 g of a 2 M solution of anhydrous $LiClO_4$ in DPM, 0.28 g ethylene carbonate (EC, Aldrich, CAS 96-49-1), 0.9 g of a 4 weight percent solution of bromocresol green sodium salt (BCG-Na, Aldrich, CAS 62625-32-5) in DPM, 0.3928 g of a 3 weight percent solution of dicyclohexylamine (DCHA, Aldrich, 101-83-7) in DPM, 0.3724 g of a 10 weight percent solution of biphenol (Aldrich, CAS 92-88-6) in DPM (see Table 3 for relative weight percents of the components). A thin film was prepared on the surface a pair of electrodes (20 nm of titanium, 40 nm of copper, 10 nm of Ti—W, and then 30 nm of gold patterned on the surface of a DVD-9) by spin coating (2000 RPM, 20 sec) a drop of the mixture over the electrodes. A voltage (10 V) was applied across the electrodes for 5 seconds and a change in percent reflectivity at 650 nm from 40 percent to 85 percent was recorded using an Ocean Optics instrument as the film changed from blue to yellow.

TABLE 3

| Chemical | Millimoles | Weight Percent |
|---|---|---|
| Dow PM | — | 78.1 |
| PEMA | — | 8.3 |
| BCG-Na | 0.050 | 1.0 |
| $LiClO_4$ | 1.15 | 3.8 |
| DCHA | 0.065 | 0.4 |
| Biphenol | 0.20 | 1.0 |
| EC | 3.2 | 8.1 |

Example 6

Provides an Electrically Responsive Ink Composition and an Electrically Responsive Layer and Methods for Preparing the Same Preparation of stock solution 3: To a 20 mL vial was added 3 g of a 30 weight percent solution of poly(vinylpyrrolidone) (Mw 55000, Aldrich, CAS 9003-39-8) in DPM, 1.396 g of a 2M solution of LiClO4 in DPM, 4.2 g of a 4 wt % solution of BCG-Na in DPM, 0.987 g of a 3 weight percent solution of DCHA in DPM, and 1.738 g of a 10 weight percent solution of biphenol in DPM.

A 20 ml vial was charged with 1 g of the stock solution 3 and 0.15 g of a 50 weight percent solution of PEG-400 in DPM and stirred (see Table 4 for relative weight percents of the components). A thin film was prepared on the surface of two electrodes (20 nm of titanium, 40 nm of copper, 10 nm of Ti—W, and then 30 nm of gold on the surface of a DVD-9) patterned on a DVD-9, by spin coating (2000 RPM, 20 sec) a drop of the mixture over the electrodes. A voltage (50 V) was applied across the electrodes for 2 minutes and an increase in percent reflectivity at 650 nm from 41 percent to 96 percent was recorded using an Ocean Optics instrument as the film changed from blue to yellow.

TABLE 4

| Chemical | Millimoles | Weight Percent (%) |
|---|---|---|
| Dow PM | — | 84.1 |
| PVPD | — | 4.6 |
| BCG-Na | 0.021 | 1.28 |
| $LiClO_4$ | 0.22 | 2.0 |
| DCHA | 0.027 | 0.3 |
| Biphenol | 0.08 | 1.3 |
| PEG-400 | — | 6.5 |

Example 7

Provides Four UV Curable Acrylate Compositions Methods for Preparing the Same The four UV curable acrylate formulations were prepared by mixing together the components listed in Table 5 below.

TABLE 5

| | Composition 1 | | Composition 2 | | Composition 3 | | Composition 4 | |
|---|---|---|---|---|---|---|---|---|
| Component | Mass (g) | Weight percent | Mass (g) | Weight percent | Mass (g) | Weight percent | Mass (g) | Weight percent |
| SR610 | 1.65 | 11 | 1.65 | 11 | 1.65 | 11 | 2.4 | 16 |
| SR351 | 3.15 | 21 | 3.15 | 21 | 3.15 | 21 | 4.65 | 31 |
| PEG-400 | 4.35 | 29 | 4.35 | 29 | 4.35 | 29 | 6.6 | 44 |
| $LiClO_4$ | 0.9 | 6 | 0.9 | 6 | 0.9 | 6 | 0.9 | 6 |
| EC | 0 | 0 | 4.5 | 30 | 2.25 | 15 | 0 | 0 |
| PC | 4.5 | 30 | 0 | 0 | 2.25 | 15 | 0 | 0 |
| Darocur-1174 | 0.45 | 3 | 0.45 | 3 | 0.45 | 3 | 0.45 | 3 |

Cylindrical samples for ion conductivity measurements were prepared (approximate diameter equal to 1.27 centimeters; thickness equal to 1.65 millimeters) using a Teflon spacer and UV cured between glass plates by being subjected to 2×3 see pulse of intense UV exposure using a Xenon Corp (RC-747, Wilmington, Mass.) UV lamp. The samples were placed between stainless steel electrodes and impedence spectra were collected using a CHI750B instrument (CHI Instruments Inc.). The impedance measurements were performed on the samples over a period of 26 days at ambient conditions and ion conductivities were calculated and summarized in Table 6.

TABLE 6

| Sample | Ion-Conductivity (S/cm) Day 1 | Day 5 | Day 26 |
|---|---|---|---|
| 1 | $4.4 \times 10^{-4}$ | $2.6 \times 10^{-4}$ | $4.3 \times 10^{-5}$ |
| 2 | $4.9 \times 10^{-4}$ | $4.3 \times 10^{-4}$ | $6.3 \times 10^{-5}$ |
| 3 | $4.5 \times 10^{-4}$ | $3.6 \times 10^{-4}$ | $6.4 \times 10^{-5}$ |
| 4 | $3.1 \times 10^{-5}$ | $7.3 \times 10^{-5}$ | $6.7 \times 10^{-5}$ |

Example 8

Provides DVD's Coated with an Electrically Responsive Layer and a Method for Preparing the Same Two DVDs were prepared having electrodes (20 nm of titanium, 40 nm of copper, 10 nm of Ti—W, and then 30 nm of gold) sputtered on the data side of a DVD-9. An electrically responsive material comprised of 1.5 g of a 15 weight percent solution of poly(ethyl methacrylate) (Mw 350.000, Polymer Source, CAS 9011-14-7) in DPM, 0.488 g of a 2 molar solution of anhydrous $LiClO_4$ in DPM, 0.22 g ethylene carbonate, 0.9 g of a 4 weight percent solution of bromocresol green sodium salt in DPM, 0.3928 g of a 3 weight percent solution of dicyclohexylamine in DPM, 0.3724 g of a 10 weight percent solution of biphenol in DPM was prepared and a drop of the material was placed on the discs and spin coated (2000 rotations per minute, 10 seconds) over a portion of the electrodes on the data side of the disc.

Disc 1—The electrically responsive layer was initially colored blue with a percent reflectivity of 35 percent as measured using an Ocean Optics instrument. A voltage (40 V) was applied to the electrodes for 5 seconds and the film changed from blue to yellow with an increase of 65 percent in percent reflectivity.

Disc 2—The electrically responsive layer was initially colored blue with a percent reflectivity of 44 percent as measured using an Ocean Optics instrument. The disc is left in a dessicator for 24 hours, a voltage (50 V) was applied to the film for 10 seconds and no change in color of the film was observed. After the voltage was applied for up to 2 minutes, a small increase of 3 percent in percent reflectivity was observed.

Example 9

Provides DVD's Coated with an Electrically Responsive Layer and a Method for Preparing the Same Two DVDs are prepared having electrodes (20 nm of titanium, 40 nm of copper, 10 nm of Ti—W, and then 30 nm of gold) sputtered on the data side of the DVD-9. An electrically responsive layer is spin coated, ink jet printed, or screen printed over a portion of the electrodes. A UV curable silicone hardcoat (UVHC 8558, Momentive Performance Materials, Wilton, Conn.) is applied on top of the electrically responsive layer by spin coating. The silicon hardcoat is UV cured using a 2 sec pulse of intense UV exposure with a Xenon Corp (RC-747, Wilmington, Mass.) lamp.

Disc 1—The electrically responsive layer is initially colored blue. A voltage is applied to the electrodes and the film changes color from blue to yellow.

Disc 2—The disc is left in a dessicator for 24 hours. The electrically responsive layer is initially colored blue. A voltage is applied to the electrodes and the film changes color from blue to yellow.

Example 10

Provides DVD's Coated with an Electrically Responsive Layer and a Method for Preparing the Same A DVD is prepared that has an electrically responsive layer near the table-of-contents region of the data layer. The electrochemically responsive layer is initially colored blue and significantly absorbs 650 nm laser light. The DVD is placed in a DVD player but does not play. A similar DVD is prepared that also has the electrically responsive layer. A tag, containing electronic components which include a pair of electrodes, is placed over the electrically responsive layer such that the electrodes are in physical contact with the electrically responsive layer. This DVD, in its case, is exposed at point-of-sale to a 5 W, 13.56 MHz RF source that induces an electrical current in the antenna. The current generates a voltage at the electrodes and a redox reaction occurs in the electrically responsive layer. The redox reaction could include the generation of an acid through the oxidation of an electrochemically latent acid (a phenol) resulting in a change in the pH of the electrically responsive layer. The change in pH of the layer causes a pH-sensitive dye (e.g. bromocresol green) to turn from blue-colored to yellow. The DVD is removed from its case and placed in a DVD player. The DVD boots-up and is easily read by a drive with no loss of data.

Example 11

Provides a DVD Coated with an Electrically Responsive Layer and a Method for Preparing the Same A DVD is prepared that has electrodes, comprised of electrically conductive material such as ITO, sputtered or printed on the data side of the DVD such that the electrodes span a portion of the disc ranging from the inner hub to a distance of approximately 25 mm from the inner hub. An electrically responsive layer is printed at about 25 mm from the center of the disc and a UV-curable hardcoat is spin coated over the electrically responsive layer. A tag is place over the electrically responsive layer and the electrodes such that electrical contact is made between the electronics on the tag and the electrically conductive material on the inner hub region of the disc. The electrically responsive layer is initially colored blue and significantly absorbs light at 650 nm. The DVD is placed in a DVD player but does not play. A similar DVD is prepared that also has the electrically responsive layer. This DVD, in its case is exposed at point-of-sale to a 5 W 13.56 MHz RF source that induces an electrical current in the antenna on the tag. The current generates a voltage at the electrodes and a redox reaction occurs in the electrically responsive layer. The redox reaction could include the generation of an acid through the oxidation of an electrochemically latent acid (a phenol) resulting in a change in the pH of the electrically responsive layer. The change in pH of the layer causes a pH sensitive dye (e.g., bromocresol green) to turn from blue-colored to yellow. The DVD is removed from the case, the tag is peeled off of the DVD, and the DVD is placed in a DVD player. The DVD boots-up and is easily read by a drive with no loss of data.

Example 12

Provides a DVD Coated with an Electrically Responsive Layer and a Method for Preparing the Same An electrically responsive layer is printed on the data side of a DVD that comprises a polymeric binder consisting of a copolymer comprising of a polyol such as polyethylene glycol (PEG), polyethylene oxide (PEO), polypropylene glycol (PPG) or the like. Six DVD samples are prepared with polymeric binders as listed in Table 5 below. For samples 1, 2 and 3, PEG and/or PPG units are incorporated into polycarbonate copolymers as part of the polymer backbone, as pendant side chain units, or as endgroup components. For samples 4 and 5, the PEG (ethylene oxide) units are incorporated into poly (methyl methacrylate) (PMMA) copolymers as part of the polymer backbone, or as pendant side chain units. An exemplary example (sample 4) is a PMMA-block-ethylene oxide block copolymer (P4006-EOMMA) obtained from Polymer Source (Dorval, Quebec, Canada). Another exemplary example (sample 5) is a PMMA-graft-ethylene oxide copolymer (PMMA-PEGMA) prepared by copolymerizing methyl methacrylate with Poly(ethylene glycol)methacrylate (409529, Aldrich). It is anticipated that other polymethacrylates or polyacrylates can be used as well. The PEG or PEO units are incorporated into polystyrene copolymers as part of the polymer backbone, or as pendant side chain units. An exemplary example (sample 6) is a PS-graft-ethylene oxide copolymer (P2624-SEOcomb) obtained from Polymer Source (Dorval, Quebec, Canada). The weight percents of the PEG and/or PPG in the polymer compositions are listed in Table 7.

TABLE 7

| Sample | Architecture | Composition | Mw (kg/mol) | Weight percent PEG |
|---|---|---|---|---|
| 1 | Backbone | PEG-PPG-PEG | 1.9 | 10-30% |
| 2 | Side chain | PEG | ≦5.0 | 3-17% |
| 3 | Endcap | PEG-R (R = Me, C18, C14-50 mix) | — | 2-30% |
| 4 | Backbone | PMMA-PEG (P4006-EOMMA) | 51 | 9% |
| 5 | Graft | PMMA-PEGMA | 85 | 10% |
| 6 | Graft | PS-PEG (P2624-SEOcomb) | 10 | 60% |

The polycarbonate—PEG and/or PPG copolymers are dissolved in a mixture of diacetone alcohol (DAA) and Dowanol DPM (Dow DPM). To this mixture is added an electrolyte (e.g., $LiClO_4$), a pH responsive dye (e.g., BCG), a base (e.g., dicyclohexylamine) to adjust the pH so that the mixture is blue, an electrochemically latent acid (e.g., biphenol) and a plasticizer (optional). The mixture is printed on the surface of a DVD forming a thin film (less than 1 micron) of the electrically responsive layer and is blue in color. A voltage is applied to the film resulting in a change in color of the electrically responsive layer from blue to yellow.

Example 13

Provides an Optical Article Comprising an Electrically Responsive Single Layer, and an Electrode Configuration to Affect an Electrochromic Color Change therein and a Method for Preparing the Same An optical article (e.g., a DVD disc, a Bluray disc, or an HD-DVD disc) is prepared comprising at least one pair of electrodes deposited on the data side of the disc, which are in physical and electrical contact with the same side of an electrically responsive single layer, which itself is deposited on the data side of the optical article. Optionally, a protective second layer (e.g. a UV crosslinkable hardcoat or a UV crosslinkable laminate coating) could be deposited over the electrically responsive single layer, to serve as a protective barrier to both physical and environmental effects. The first step is to deposit at least one pair of electrodes onto the data side of the optical article.

The electrodes are made of a material that is transparent to the wavelength of a laser light in the optical article reader, (e.g., 650 nm for DVD or 405 nm for Bluray and HD-DVD) and preferably should be relatively small (e.g., 0.5 mm wide×2 mm long×100 nm thick). Indium-tin-oxide (ITO)) is a suitable electrode material, and can be deposited by any number of conventional techniques, including sputtering, at any location on the data side of the disc, although specific locations which correlate with specific data on the optical article are used in many embodiments (e.g., the table-of-contents region on a DVD). The electrodes are connected to conductive pads via narrow (less than 0.1 mm wide) conductive traces of similar thickness to the electrodes (e.g., 100 nm), and the pads can be located on the hub portion of the disc so as to not cover any portion of the data layer. The pads and traces can be made from the same material(s) as the electrodes, and the pads can have variable dimensions (e.g., 4 mm wide×4 mm long×100 nm thick) to facilitate contact with an external source of electrical power, such as a removable wirelessly powered flexible tag. The spacing between the electrodes is also variable, although electrodes spaced around 1 mm apart are desirable to maximize the electric field between the anode and cathode at a given voltage.

Once the desired electrode configuration has been deposited onto the data side of the disc, the next step is to deposit an electrically responsive layer across at least a portion of the electrodes. This electrically responsive layer can be deposited from a printable ink formulation by any number of conventional printing techniques such as ink jet printing, or screen printing. Suitable examples of an electrically responsive printable ink formulation are described in Examples 1-5. Although the composition of the ink formulations are variable, e.g. parameters such as viscosity and elasticity can be tuned to meet the specifications of a given printing technique, the resulting electrically responsive layer once deposited on the data side of the optical article, and essentially free of solvent, possesses an ion conductivity greater than about $10^{-8}$ S/cm.

Furthermore, it is important to appreciate that once deposited, the electrically responsive layer makes adequate contact with both the anode and the cathode so that an electrical current can be passed through the electrically responsive layer. An optional protective layer could be coated over a portion of the data side of the optical article, such that it coats at least the electrically responsive layer, however it would be preferable to coat the entire data side of the optical article using conventional spin coating technology. A suitable protective coating is the commercially available hardcoat material UVHC 8558 (Momentive Performance Materials, Wilton, Conn.), which can be evenly deposited across the data side of the optical article at a thickness of about 2 microns by spin coating UVHC 8558 at 5000 rpm for 6 seconds, and crosslinking UVHC 8558 using a short pulse of intense UV light.

Finally, to affect a color change in the electrically responsive layer, a voltage can be applied across the electrodes by making adequate electrical contact between the electrically conductive pads and an external electrical power supply. Alternatively, the voltage can be applied from a WPFT that is packaged with the optical article. The rate of color change is proportional to the applied voltage, and the electrically responsive layer is subjected to a suitable voltage in the range of about 1 V to about 50 V, which will affect significant color change in the electrically responsive layer in less than about 10 seconds.

Example 14

Provides an Optical Article Comprising an Electrically Responsive Single Layer, and a Tag Configuration to Affect an Electrochromic Color Change therein and a Method of Preparing the Same An optical article (e.g., a DVD disc, a Bluray disc, or an HD-DVD disc) could be prepared comprising an electrically responsive single layer, which itself is deposited on the data side of the optical article. Optionally, a protective second layer (e.g. a UV crosslinkable hardcoat or a UV crosslinkable laminate coating) could be deposited over the electrically responsive single layer, to serve as a protective barrier to both physical and environmental effects.

The first step is to deposit an electrically responsive layer across at least a portion of the data side of the optical article using a printing process and ink formulation as described in Example 12. An optional protective layer could be coated over a portion of the data side of the optical article, such that it coats at least the electrically responsive layer, however it would be preferable to coat the entire data side of the optical article using conventional spin coating technology. A suitable protective coating is the commercially available hardcoat material UVHC 8558 (Momentive Performance Materials, Wilton, Conn.), which can be evenly deposited across the data side of the optical article at a thickness of about 2 microns by spin coating and curing.

Finally, to affect a color change in the electrically responsive layer, a tag comprising at least one pair of electrodes is applied to the DVD, such that the electrodes are in direct physical and electrical contact with the same side of the electrically responsive layer. Alternatively, if the optically transparent protective layer is used, the electrodes are contacted to the protective layer. To activate the optical article, an electrical current is induced in an RF circuit on the tag by wirelessly coupling the tag to an external activation equipment. The electrical current creates a voltage across the electrodes. The rate of color change is proportional to the applied voltage, and the electrically responsive layer is subjected to a suitable voltage in the range of about 1 V to about 50 V, which will affect significant color change in the electrically responsive layer in less than about 10 seconds.

While the techniques and systems above have been described in detail in connection with only a limited number of embodiments, it should be readily understood that their application is not limited to such disclosed embodiments. Rather, they can be modified to incorporate any number of variations, alterations, substitutions or equivalent arrangements not heretofore described, but which are commensurate with the spirit and scope of the description above. Accordingly, the concepts above are not to be seen as limited by the foregoing description, but only limited by the scope of the appended claims.

The invention claimed is:

1. A method of changing a functionality of an optical article, comprising:

exposing the optical article to an external stimulus, the optical article comprising:

an optical data layer storing data; and an electrically responsive layer disposed over the optical data layer, wherein the electrically responsive layer transforms from a first optical state to a second optical state upon exposure of the optical article to the external stimulus such that the optical article irreversibly transforms from a pre-activated state of functionality, in which the data is unable to be read, to an activated state of functionality, in which the data is readable, the electrically responsive layer comprising:

a binder material;

an electrically responsive material;

an electrolyte; and at least two electrodes in electrical contact with the electrically responsive layer, wherein each of the electrodes includes a plurality of sub-electrodes that are interdigitated and disposed on the electrically responsive layer, the electrodes having an orientation generally parallel to a surface of the optical article.

2. The method of claim 1, wherein exposing the optical article to the external stimulus comprises subjecting the electrically responsive material to a time-dependent voltage profile or a time-dependent electrical stimulus.

3. The method of claim 1, wherein the optical article further comprises:

a tag comprising electrical circuitry and at least one pair of electrically conductive pads in contact with the at least two electrodes such that the electrically conductive pads are in electrical communication with the electrically responsive layer, and wherein the method further comprises:

exposing the tag to the external stimulus by sending a signal from an activation system to the tag;

converting the external stimulus into an electrical stimulus with the electrical circuitry of the tag to generate a time-dependent voltage profile; and subjecting the electrically responsive layer to the time-dependent voltage profile such that the electrically responsive layer converts from the first optical state to the second optical state.

4. The method of claim 1, wherein the ion-conductivity of the electrically responsive layer is greater than about $10^{-8}$ S/cm.

5. The method of claim 1, wherein the electrically responsive material comprises one or more of a dye, an initiator, a catalyst, an electrochemical acid generator, an electrochemical base generator, an electrochemically polymerizable material, an electrochromic material, or a redox material.

6. The method of claim 1, wherein the electrically responsive material comprises one or more of a leuco dye, a pH sensitive dye, an electrochemically degradable dye, an electrochemically responsive dye, or a redox dye.

7. The method of claim 1, wherein the binder material comprises a polymeric material.

8. The method of claim 7, wherein the polymeric material comprises one or more polymers selected from the group consisting of a homopolymer, a random copolymer, a block copolymer, a polymer blend, a branched copolymer, and a cross-linked polymer.

9. The method of claim 1, wherein the binder material comprises an ion-conducting polymeric material.

10. The method of claim 9, wherein the ion-conducting polymeric material comprises one or more of poly(ethylene oxide) (PEO), poly(propylene oxide) (PPO), poly(acrylonitrile) (PAN), poly(ethyl methacrylate), poly(vinylpyrrolidone), poly(methyl methacrylate) (PMMA), sulfonated tetrafluoroethylene copolymer, poly(vinylbutyral), poly(vinylacetate), poly(ethers), poly(phenols), or copolymers thereof.

11. The method of claim 1, wherein the electrolyte comprises an ionic liquid or a salt.

12. The method of claim 9, wherein the ion-conducting polymeric material comprises one or more cross-linkable moieties.

13. The method of claim 1, wherein the electrically responsive layer further comprises a plasticizer.

14. The method of claim 1, wherein the electrically responsive layer further comprises one or more of a pH modifier, an anti-photobleach agent, or a combination thereof.

15. The method of claim 1, wherein the optical article further comprises a wirelessly powered flexible tag operably coupled with the electrically responsive layer, wherein the tag interacts with the external stimulus upon exposing the optical article to the external stimulus.

16. The method of claim 1, comprising applying a voltage difference of 0.1 Volts to about 50 Volts across the electrically responsive layer to transform from the first optical state to the second optical state.

17. An activation system for transforming an optical article from a pre-activated state of functionality to an activated state of functionality, comprising:

an optical article comprising:

at least one optical data layer storing data;

an electrically responsive layer disposed on the at least one optical data layer, wherein the electrically responsive layer is configured to transform from a first optical state to a second optical state upon exposure to an electrical stimulus to irreversibly transform the optical article from the pre-activated state of functionality, in which the electrically responsive layer renders the data unreadable, to the activated state of functionality, in which the data is able to be read through the electrically responsive layer; and at least two electrodes in electrical contact with the electrically responsive layer, wherein each of the electrodes includes a plurality of sub-electrodes that are interdigitated and disposed on the electrically responsive layer, the electrodes having an orientation generally parallel with respect to a surface of the optical article;

an activation device configured to apply the electrical stimulus to the optical article to change the electrically responsive layer from the first optical state to the second optical state; and a communication device configured to provide an activation signal to the activation device to enable the activation device to apply the electrical stimulus to the optical article.

18. The system of claim 17, wherein the communication device comprises a radiofrequency identification (RFID) reader disposed outside the optical article.

* * * * *